US012509537B2

(12) United States Patent
DeLorbe et al.

(10) Patent No.: US 12,509,537 B2
(45) Date of Patent: Dec. 30, 2025

(54) PROCESS FOR THE PRODUCTION OF POLYMER COMPOSITIONS WITH EXCELLENT PROCESSABILITY

(71) Applicant: DOW GLOBAL TECHNOLOGIES LLC, Midland, MI (US)

(72) Inventors: Johnathan E. DeLorbe, Manvel, TX (US); Daniela Ferrari, Rosharon, TX (US); Thomas Wesley Karjala, Jr., Lake Jackson, TX (US); Sylvie Vervoort, Ghent (BE); Jeffrey C. Munro, Bellaire, TX (US); Lisa S. Madenjian, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 749 days.

(21) Appl. No.: 17/773,571

(22) PCT Filed: Dec. 16, 2020

(86) PCT No.: PCT/US2020/065379
§ 371 (c)(1),
(2) Date: Apr. 29, 2022

(87) PCT Pub. No.: WO2021/133613
PCT Pub. Date: Jul. 1, 2021

(65) Prior Publication Data
US 2022/0389138 A1    Dec. 8, 2022

Related U.S. Application Data

(60) Provisional application No. 62/953,707, filed on Dec. 26, 2019.

(51) Int. Cl.
*C08F 210/16* (2006.01)
*C08F 4/64* (2006.01)

(52) U.S. Cl.
CPC ........ *C08F 210/16* (2013.01); *C08F 4/64193* (2013.01)

(58) Field of Classification Search
CPC .. C08F 210/16; C08F 210/14; C08F 4/64193; C08F 2410/04
See application file for complete search history.

(56) References Cited

U.S. PATENT DOCUMENTS

| | | | |
|---|---|---|---|
| 5,849,823 A | 12/1998 | Kale et al. | |
| 6,451,894 B1 | 9/2002 | Srinivasan et al. | |
| 8,581,094 B2 | 11/2013 | Patel et al. | |
| 8,697,984 B2 | 4/2014 | Amamiya et al. | |
| 9,349,895 B2 | 5/2016 | Ikenaga et al. | |
| 9,587,094 B2 | 3/2017 | Maeyama et al. | |
| 10,870,714 B2* | 12/2020 | Patel | C08L 23/04 |
| 11,326,045 B2* | 5/2022 | Mazzola | B32B 27/20 |
| 11,680,119 B2* | 6/2023 | Ferrari | C08F 210/16 526/64 |
| 11,680,120 B2* | 6/2023 | Wang | C08F 210/16 525/240 |
| 2003/0065097 A1 | 4/2003 | DeGroot et al. | |
| 2011/0282018 A1 | 11/2011 | Klosin et al. | |
| 2011/0290317 A1 | 12/2011 | Naumovitz et al. | |
| 2012/0000514 A1 | 1/2012 | Amamiya et al. | |
| 2022/0380497 A1* | 12/2022 | Wu | C08J 3/24 |

FOREIGN PATENT DOCUMENTS

| | | | |
|---|---|---|---|
| EP | 2637217 | 3/2016 | |
| EP | 2958151 | 10/2018 | |
| JP | 2012009688 A | 1/2012 | |
| WO | 2001014434 | 3/2001 | |
| WO | 2012027448 | 3/2012 | |
| WO | 2014106017 A1 | 7/2014 | |
| WO | 2016014749 | 1/2016 | |
| WO | 2018022588 | 2/2018 | |
| WO | 2018022975 | 2/2018 | |
| WO | 2018170208 A1 | 9/2018 | |
| WO | 2019000744 | 1/2019 | |
| WO | 2019133368 A1 | 7/2019 | |
| WO | 2019133378 A1 | 7/2019 | |
| WO | 2019133394 | 7/2019 | |
| WO | WO 2019133368 A1 * | 7/2019 | ............ C08F 210/16 |
| WO | 2021128127 | 7/2021 | |
| WO | 2021128128 | 7/2021 | |
| WO | 2021133640 | 7/2021 | |

OTHER PUBLICATIONS

PCT/US2020/065378, International Search Report and Written Opinion with a mailing date of Jun. 10, 2021.
PCT/US2020/065378, International Preliminary Report on Patentability with a mailing date of Jun. 28, 2022.
Office Action from corresponding Chinese application: 2020800894915 dated Jul. 11, 2024.

* cited by examiner

*Primary Examiner* — Rip A Lee

(57) ABSTRACT

A process to prepare an alpha composition comprising a first ethylene/alpha-olefin/interpolymer fraction and a second ethylene/alpha-olefin/interpolymer fraction; said process comprising polymerizing, in one reactor, a reaction mixture, comprising ethylene and an alpha-olefin, a biphenyl phenol metal complex selected from Structure 1, as described herein, and a biphenyl phenol metal complex selected from Structure 2, as described herein; and alpha compositions prepared therefrom.

7 Claims, 1 Drawing Sheet

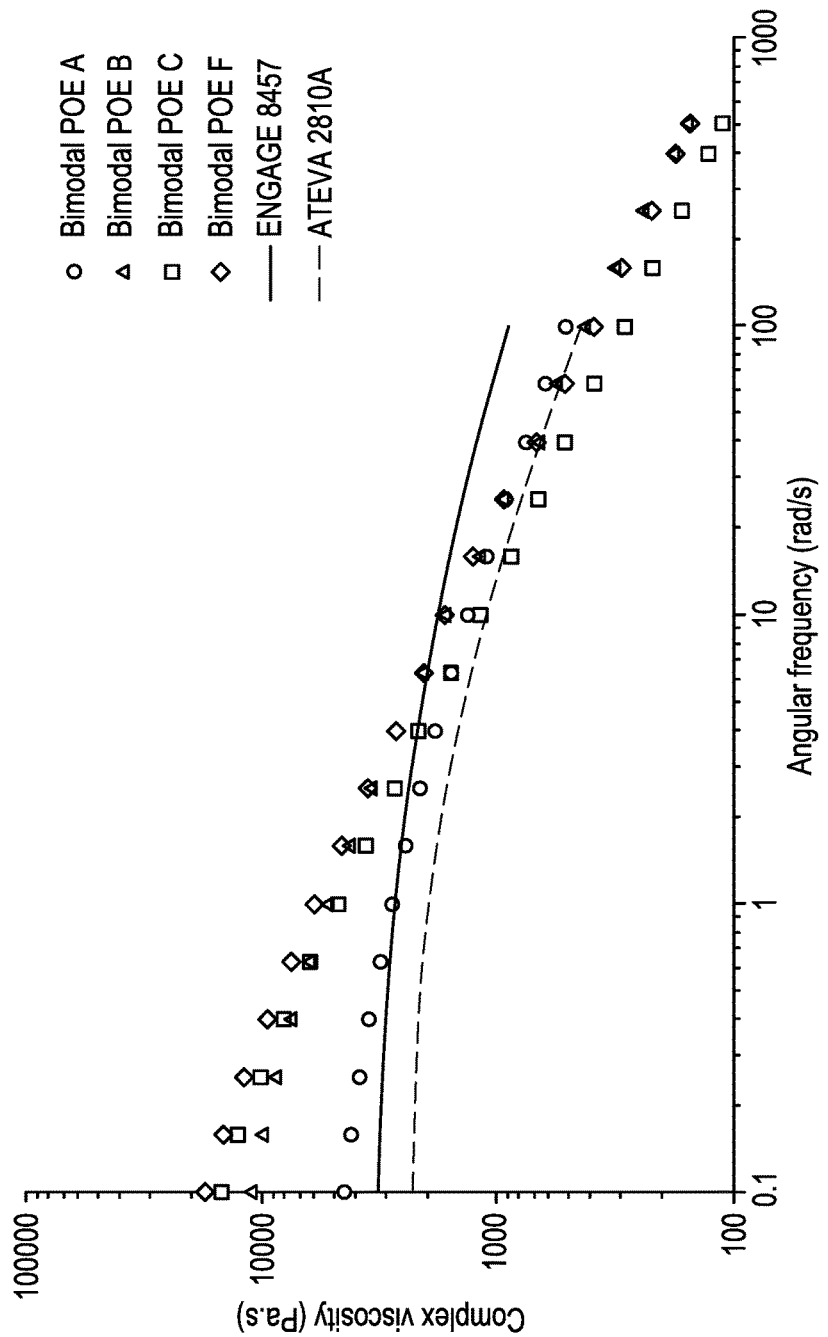

PROCESS FOR THE PRODUCTION OF POLYMER COMPOSITIONS WITH EXCELLENT PROCESSABILITY

CROSS REFERENCE TO RELATED APPLICATIONS

The present application claims benefit of priority to U.S. Application No. 62/953,707, filed on Dec. 26, 2019, which is incorporated herein by reference in its entirety.

BACKGROUND OF THE INVENTION

Improved elastomer processability is one of the key needs of end-use manufacturers for various elastomeric products, such as automotive parts, photovoltaic components, wire and cable components and footwear components. There is a need for new elastomer resins with improved processability, as indicated by excellent shear thinning behavior. Such resins should polymerize in cost-effective, high efficiency processes.

U.S. Publication 2011/0290317 discloses the preparation, and electronic applications, of bimodal and multimodal ethylene-based polymers. These polymers are prepared in two reactors, adding complexity and capital costs to the overall polymerization process. International Publication WO2018/022588 discloses the polymerization of multimodal elastomers, mostly synthesized in the presence of a biphenyl phenol catalyst and a constrained geometry catalyst (CGC). One comparative example (Comp. C), which uses two biphenyl phenol catalysts, had a low overall catalyst efficiency of $1.4 \times 10^6$ g polymer per g total catalyst metal. Additional in-situ, bimodal ethylene-based polymers and post reactor blends are disclosed in the following references: WO2001/014434 (polymerization using a mixed constrained geometry catalyst system, WO2002/074817 (polymerization using a mixed constrained geometry catalyst system), US20160115264 (metallocene-catalyzed polymers), U.S. Pat. No. 5,849,823 (blends of linear or substantially linear homogeneously branched ethylene/alpha-olefin interpolymers), U.S. Pat. No. 6,451,894 (blends that include a crystalline or semi-crystalline polyolefin or a copolymer of ethylene and a C3 to C10 olefin, and a multimodal elastomer of sequentially polymerized ethylene-alpha-olefin monomers; see also U.S. Pat. No. 6,610,408). However, the cited art does not promote elastomer resins with excellent shear thinning behavior, and which can be polymerized in cost-effective, high efficiency processes. These needs have been met by the following invention.

SUMMARY OF THE INVENTION

A process to prepare an alpha composition comprising a first ethylene/alpha-olefin/interpolymer fraction and a second ethylene/alpha-olefin/interpolymer fraction; said process comprising polymerizing, in one reactor, a reaction mixture, comprising ethylene, an alpha-olefin, a metal complex selected from a) below, and a metal complex selected from b) below:

a) a biphenyl phenol metal complex selected from the following Structure 1:

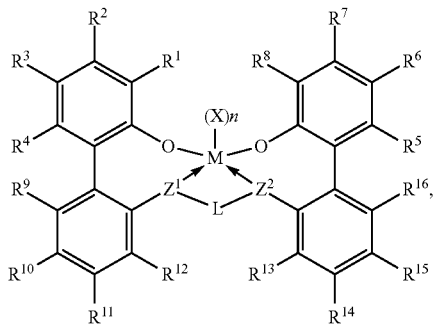

Structure 1 where:
M is a metal chosen from zirconium (Zr), or hafnium (Hf), the metal being in a formal oxidation state of +2, +3, or +4;
n is 0, 1, or 2;
when n is 1, X is a monodentate ligand or a bidentate ligand;
when n is 2, each X is an independently chosen monodentate ligand;
the metal complex is overall charge-neutral;
each of $-Z^1-$ and $-Z^2-$ is independently selected from $-O-$, $-S-$, $-N(R^N)-$, or $-P(R^P)-$;
$R^1$ and $R^8$ are independently selected from the group consisting of $-H$, $(C_1-C_{40})$hydrocarbyl, $(C_1-C_{40})$heterohydrocarbyl, $-Si(R^C)_3$, $-Ge(R^C)_3$, $-P(R^P)_2$, $-N(R^N)_2$, $-OR^C$, $-SR^C$, $-NO_2$, $-CN$, $-CF_3$, $R^CS(O)-$, $R^CS(O)_2-$, $(R^C)_2C=N-$, $R^CC(O)O-$, $R^COC(O)-$, $R^CC(O)N(R)-$, $(R^C)_2NC(O)-$, halogen, radicals having formula (I), radicals having formula (II), and radicals having formula (III):

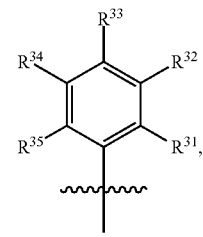

(I)

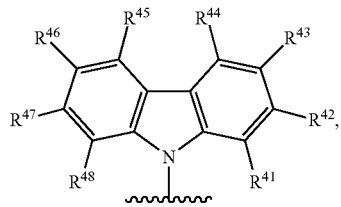

(II)

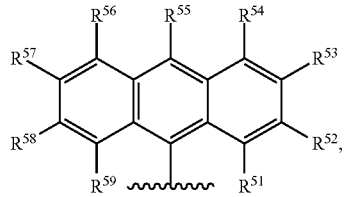

(III)

where each of $R^{31-35}$, $R^{41-48}$, and $R^{51-59}$ is independently selected from $(C_1-C_{40})$hydrocarbyl, $(C_1-C_{40})$heterohydrocarbyl, —Si($R^C$)$_3$, —Ge($R^C$)$_3$, —P($R^P$)$_2$, —N($R^N$)$_2$, —N=CHR$^C$, —OR$^C$, —SR$^C$, —NO$_2$, —CN, —CF$_3$, R$^C$S(O)—, R$^C$S(O)$_2$—, (R$^C$)$_2$C=N—, R$^C$C(O)O—, R$^C$OC(O)—, R$^C$C(O)N(R$^N$)—, (R$^C$)$_2$NC(O)—, halogen, or —H;

each of $R^{2-7}$, $R^{9-16}$ is independently selected from (C$_1$-C$_{40}$)hydrocarbyl, (C$_1$-C$_{40}$)heterohydrocarbyl, —Si($R^C$)$_3$, —Ge($R^C$)$_3$, —P($R^P$)$_2$, —N($R^N$)$_2$, —N=CHR$^C$, —OR$^C$, —SR$^C$, —NO$_2$, —CN, —CF$_3$, R$^C$S(O)—, R$^C$S(O)$_2$—, (R$^C$)$_2$C=N—, R$^C$C(O)O—, R$^C$OC(O)—, R$^C$C(O)N(R$^N$)—, (R$^C$)$_2$NC(O)—, halogen, or —H;

L is (C$_1$-C$_{40}$)hydrocarbylene or (C$_1$-C$_{40}$)heterohydrocarbylene, wherein the (C$_1$-C$_{40}$)hydrocarbylene has a portion that comprises a 1-carbon atom to 10-carbon atom linker backbone, linking the two Z groups in Structure 1 (to which L is bonded); or the (C$_1$-C$_{40}$)heterohydrocarbylene has a portion that comprises a 1-atom to 10-atom linker backbone, linking the two Z groups in Structure 1, wherein each of the 1 to 10 atoms of the 1-atom to 10-atom linker backbone of the (C$_1$-C$_{40}$) heterohydrocarbylene, independently, is a carbon atom or heteroatom group, wherein each heteroatom group independently is O, S, S(O), S(O)$_2$, Si($R^C$)$_2$, Ge($R^C$)$_2$, P($R^C$), or N($R^C$), wherein, independently, each Re is (C$_1$-C$_{30}$)hydrocarbyl or (C$_1$-C$_{30}$)heterohydrocarbyl; and each $R^P$, $R^N$, and remaining $R^C$ in Structure 1 is independently a (C$_1$-C$_{30}$)hydrocarbyl, a (C$_1$-C$_{30}$)heterohydrocarbyl, or —H;

b) a biphenyl phenol metal complex selected from Structure 2:

Structure 2

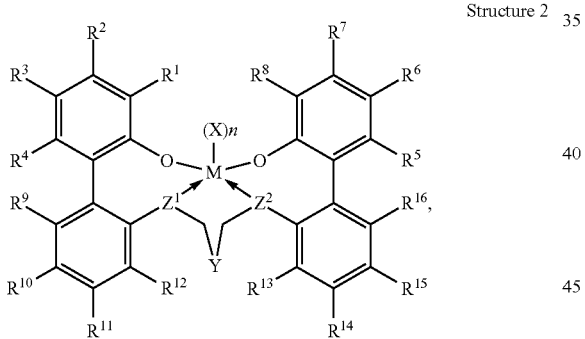

where

M is Zr or Hf the metal being in a formal oxidation state of +2, +3, or +4;

n is 0, 1, or 2;

when n is 1, X is a monodentate ligand or a bidentate ligand;

when n is 2, each X is an independently chosen monodentate ligand;

the metal complex is overall charge-neutral;

each of —$Z^1$— and —$Z^2$— is independently selected from —O—, —S—, —N(R$^N$)—, or —P(R$^P$)—;

$R^1$ and $R^8$ are independently selected from the group consisting of —H, (C$_1$-C$_{40}$)hydrocarbyl, (C$_1$-C$_{40}$)heterohydrocarbyl, —Si(R$^C$)$_3$, —Ge(R$^C$)$_3$, —P(R$^P$)$_2$, —N(R$^N$), —OR$^C$, —SR$^C$, —NO$_2$, —CN, —CF$_3$, R$^C$S(O)—, R$^C$S(O)$_2$—, (R$^C$)$_2$C=N—, R$^C$C(O)O— R$^C$OC(O)—R$^C$C(O)N(R)—, (R$^C$)$_2$NC(O)—, halogen, radicals having formula (I), radicals having formula (II), and radicals having formula (III):

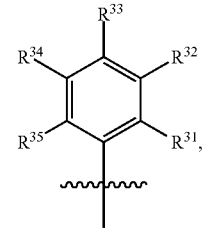

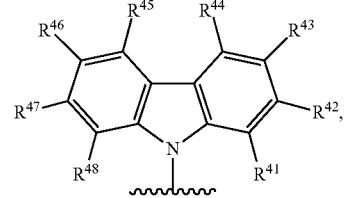

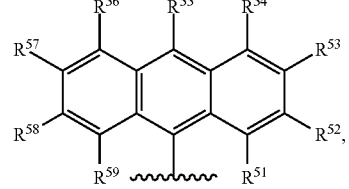

where each of $R^{31-35}$, $R^{41-48}$, and $R^{51-59}$ is independently selected from (C$_1$-C$_{40}$)hydrocarbyl, (C$_1$-C$_{40}$)heterohydrocarbyl, —Si($R^C$)$_3$, —Ge($R^C$)$_3$, —P($R^P$)$_2$, —N($R^N$)$_2$, —N=CHR$^C$, —OR$^C$, —SR$^C$, —NO$_2$, —CN, —CF$_3$, R$^C$S(O)—, R$^C$S(O)$_2$—, (R$^C$)$_2$C=N—, R$^C$C(O)O—, R$^C$OC(O)—, R$^C$C(O)N(R$^N$)—, (R$^C$)$_2$NC(O)—, halogen, or —H;

each of $R^{2-7}$, $R^{9-16}$ is independently selected from (C$_1$-C$_{40}$)hydrocarbyl, (C$_1$-C$_{40}$)heterohydrocarbyl, —Si($R^C$)$_3$, —Ge($R^C$)$_3$, —P($R^P$)$_2$, —N($R^N$)$_2$, —N=CHR$^C$, —OR$^C$, —SR$^C$, —NO$_2$, —CN, —CF$_3$—, R$^C$S(O)—, R$^C$S(O)$_2$—, (R$^C$)$_2$C=N—, R$^C$C(O)O—, R$^C$OC(O)—, R$^C$C(O)N(R$^N$)—, (R$^C$)$_2$NC(O)—, halogen, or —H;

Y is either —(CH$_2$)$_n$—, where n=0 to 2; —CR$^a$R$^b$—, where R$^a$ and R$^b$ are each independently (C$_1$-C$_{40}$)hydrocarbyl, (C$_1$-C$_{40}$)heterohydrocarbyl, or —H; —Ge(R$^D$)$_2$— or —Si(R$^D$)$_2$—, where each R$^D$ is independently selected from the group consisting of —H, (C$_1$-C$_{40}$)hydrocarbyl, (C$_1$-C$_{40}$)heterohydrocarbyl, —Si($R^C$)$_3$, —Ge($R^C$)$_3$, —P($R^P$)$_2$, —N($R^N$)$_2$, —OR$^C$, —SR$^C$, —NO$_2$, —CN, —CF$_3$, R$^C$S(O)—, R$^C$S(O)$_2$—, (R$^C$)$_2$C=N—, R$^C$C(O)O—, R$^C$ OC(O)—, R$^C$C(O)N(R$^N$)—, and (R$^N$)$_2$NC(O)—; and each $R^C$, $R^P$, and $R^N$ in Structure 2 is independently a (C$_1$-C$_{30}$)hydrocarbyl, a (C$_1$-C$_{30}$)heterohydrocarbyl, or —H;

with the proviso that for one of Structure 1 or Structure 2, $R^{12}$ and $R^{13}$ cannot both be halo, when R1 and R8 are each a radical having formula (II), where $R^{43}$=$R^{46}$=t-Bu, and $R^{41-42}$=$R^{44-45}$=$R^{47-48}$=—H; and with the proviso that when Structure 1 and Structure 2 have the same R groups, Z groups, X group(s), and linker group between $Z^1$ and $Z^2$, these structures do not have the same metal (M), such that if M is Hf for one structure, the M is Zr for the other structure.

A composition comprising an alpha composition comprising a first ethylene/alpha-olefin interpolymer fraction and a second ethylene/alpha-olefin interpolymer fraction, and wherein the alpha composition comprises the following properties:
  i) an Mz/Mn≥8.0,
  ii) a density from 0.855 to 0.890 g/cc,
  iii) a V100 (190° C.)≤600 Pa·s, and
  iv) a V0.1 (190)≥4,000 Pa·s.

BRIEF DESCRIPTION OF THE DRAWINGS

FIG. 1 shows the SAOS profiles (190° C.) for the inventive alpha compositions (POE A, POE B, POE C, POE F) and two commercial resins (ENGAGE 8457 Polyolefin Elastomer and ATEVA 2810A). Profiles from top to bottom, at "0.1 rad/s": POE F, POE C, POE B, POE A, ENGAGE 8457 and ATEVA 2810A.

DETAILED DESCRIPTION OF THE INVENTION

Multimodal ethylene/alpha-olefin interpolymers have been discovered with excellent processability. These compositions exhibit low viscosity at high shear and high viscosity at low shear for improved processability; for example, low injection pressure under high shear rate injection molding or low shear heating during high shear rate mixing, and high sag resistance at low shear rate for extruded parts. It has also been discovered that such interpolymers can be produced at high temperatures (≥150° C.) and at high efficiency, using a multi catalyst system (for example, a dual catalyst system) in a single reactor. For example, under the same reactor conditions, a first catalyst produces a high molecular weight (HMW) interpolymer fraction and a second catalyst produces a low molecular weight (LMW) interpolymer fraction.

As discussed above, a process is provided to prepare an alpha composition comprising a first ethylene/alpha-olefin/interpolymer fraction and a second ethylene/alpha-olefin/interpolymer fraction; said process comprising polymerizing, in one reactor, a reaction mixture, comprising ethylene, an alpha-olefin, a metal complex selected from a) below, and a metal complex selected from b) below:
  a) biphenyl phenol metal complex selected from Structure 1, as described above (see Summary of the Invention (SOI)); and
  b) a biphenyl phenol metal complex selected from Structure 2, as described above (see SOI).

An inventive process may comprise a combination of two or more embodiments, as described herein. Each biphenyl phenol metal complex may independently comprise a combination of two or more embodiments, as described herein. As used herein, R1=$R^1$, R2=$R^2$, R3=$R^3$, and so forth. Also, the notation $R^{a(1)}$-$R^{a(n)}$, where "a(1) through a(n)" represents consecutive numbers, refers to $R^{a(1)}$, $R^{a(2)}$, $R^{a(3)}$ . . . , $R^{a(n)}$. For example, $R^{31}$-$R^{35}$ refers to $R^{31}$, $R^{32}$, $R^{33}$, $R^{34}$, $R^{35}$; and $R^{51}$-$R^{59}$ refers to $R^{51}$, $R^{51}$, $R^{53}$, $R^{54}$, $R^{55}$, $R^{56}$, $R^{57}$, $R^{58}$, $R^{59}$. In each of formulas (I)(III), the wavy line denotes an attachment (bond) between the respective formula ($R^1$ or $R^8$ group) and the remainder of the biphenyl phenol metal complex.

The term "independently selected" is used herein to indicate that the R groups, such as, $R^1$, $R^2$, $R^3$, R4, and $R^5$ can be identical or different (e.g., $R^1$, $R^2$, $R^3$, $R^4$, and $R^5$ may all be substituted alkyls or $R^1$ and $R^2$ may be a substituted alkyl and $R^3$ may be an aryl, etc.). Use of the singular includes use of the plural and vice versa (e.g., a hexane solvent, includes hexanes). A named R group will generally have the structure that is recognized in the art as corresponding to R groups having that name. These definitions are intended to supplement and illustrate, not preclude, the definitions known to those of skill in the art. When used to describe certain carbon atom-containing chemical groups, a parenthetical expression having the form "($C_x$-$C_y$)" means that the chemical group has from x carbon atoms to y carbon atoms, inclusive of x and y. For example, a ($C_1$-$C_{40}$)alkyl is an alkyl group having from 1 to 40 carbon atoms.

The term "substituent" refers to the substitution of a hydrogen atom (—H), bonded to a carbon atom or heteroatom of a corresponding unsubstituted compound, by a substituent ($R^s$). The notation "$R^S$" refers to a heteroatom or a chemical group comprising at least one Heteroatom. The term "substitution" means that at least one hydrogen atom (—H) bonded to a carbon atom or heteroatom of a corresponding unsubstituted compound is replaced by a substituent ($R^s$).

The term "—H" means a hydrogen or hydrogen radical that is covalently bonded to another atom. "Hydrogen," H, and "—H" are interchangeable, and unless clearly specified mean the same thing.

The term "($C_1$-$C_{40}$)hydrocarbyl" means a hydrocarbon radical of from 1 to 40 carbon atoms, and the term "($C_1$-$C_{40}$)hydrocarbylene" means a hydrocarbon diradical of from 1 to 40 carbon atoms, in which each hydrocarbon radical and each hydrocarbon diradical is aromatic or non-aromatic, saturated or unsaturated, straight chain or branched chain, cyclic (including mono- and poly-cyclic, fused and non-fused polycyclic, including bicyclic; 3 carbon atoms or more) or acyclic, and is unsubstituted or substituted by one or more $R^S$.

In this disclosure, a ($C_1$-$C_{40}$)hydrocarbyl can be an unsubstituted or substituted ($C_1$-$C_{40}$)alkyl, ($C_3$-$C_{40}$)cycloalkyl, ($C_1$-$C_{20}$)cycloalkyl-($C_1$-$C_{20}$)alkylene, ($C_6$-$C_{40}$)aryl, or ($C_6$-$C_{20}$)aryl-($C_1$-$C_{20}$)alkylene. In some embodiments, each of the aforementioned ($C_1$-$C_{40}$)hydrocarbyl groups has a maximum of 20 carbon atoms (i.e., ($C_1$-$C_{20}$)hydrocarbyl) and other embodiments, a maximum of 12 carbon atoms.

The terms "($C_1$-$C_{40}$)alkyl" and "($C_1$-$C_{30}$)alkyl" mean a saturated straight or branched hydrocarbon radical of from 1 to 40 carbon atoms or from 1 to 30 carbon atoms, respectively, which is unsubstituted or substituted by one or more $R^S$. Examples of unsubstituted ($C_1$-$C_{40}$)alkyl are unsubstituted ($C_1$-$C_{20}$)alkyl; unsubstituted ($C_1$-$C_{10}$)alkyl; unsubstituted ($C_1$-$C_5$)alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted ($C_1$-$C_{40}$)alkyl are substituted ($C_1$-$C_{20}$)alkyl, substituted ($C_1$-$C_{10}$)alkyl, and trifluoromethyl.

The term "($C_6$-$C_{40}$)aryl" means an unsubstituted or substituted (by one or more $R^S$) mono-, bi- or tricyclic aromatic hydrocarbon radical of from 6 to 40 carbon atoms, of which at least from 6 to 14 of the carbon atoms are aromatic ring carbon atoms, and the mono-, bi- or tricyclic radical comprises 1, 2, or 3 rings, respectively; wherein the 1 ring is aromatic and the 2 or 3 rings independently are fused or non-fused and at least one of the 2 or 3 rings is aromatic. Examples of unsubstituted ($C_6$-$C_{40}$)aryl are unsubstituted ($C_6$-$C_{20}$)aryl unsubstituted ($C_6$-$C_{18}$)aryl; 2-($C_1$-$C_5$)alkyl-phenyl; 2,4-bis($C_1$-$C_5$)alkyl-phenyl; phenyl; fluorenyl; tetrahydrofluorenyl; indacenyl; hexahydroindacenyl; indenyl; dihydroindenyl; naphthyl; tetrahydronaphthyl; and phenanthrene. Examples of substituted ($C_6$-$C_{40}$)aryl are substituted ($C_1$-$C_{20}$)aryl; substituted ($C_6$-$C_{18}$)aryl; polyfluorophenyl and pentafluorophenyl.

The term "$(C_3\text{-}C_{40})$cycloalkyl" means a saturated cyclic hydrocarbon radical of from 3 to 40 carbon atoms that is unsubstituted or substituted by one or more $R^S$. Other cycloalkyl groups (e.g., $(C_x\text{-}C_y)$cycloalkyl) are defined in an analogous manner as having from x to y carbon atoms, and being either unsubstituted or substituted with one or more $R^S$. Examples of unsubstituted $(C_3\text{-}C_{40})$cycloalkyl are unsubstituted $(C_3\text{-}C_{20})$cycloalkyl, unsubstituted $(C_3\text{-}C_{10})$cycloalkyl, cyclopropyl, cyclobutyl, cyclopentyl, cyclohexyl, cycloheptyl, cyclooctyl, cyclononyl, and cyclodecyl. Examples of substituted $(C_3\text{-}C_{40})$cycloalkyl are substituted $(C_3\text{-}C_{20})$cycloalkyl, substituted $(C_3\text{-}C_{10})$cycloalkyl, and 1-fluorocyclohexyl.

Examples of $(C_1\text{-}C_{40})$hydrocarbylene include unsubstituted or substituted $(C_6\text{-}C_{40})$arylene, $(C_3\text{-}C_{40})$cycloalkylene, and $(C_1\text{-}C_{40})$alkylene (e.g., $(C_1\text{-}C_{20})$alkylene). In some embodiments, the diradicals are on the same carbon atom (e.g., —$CH_2$—) or on adjacent carbon atoms (i.e., 1,2-diradicals), or are spaced apart by one, two, or more than two intervening carbon atoms (e.g., respective 1,3-diradicals, 1,4-diradicals, etc.). Some diradicals include α,ω-diradical. The α,ω-diradical is a diradical that has maximum carbon backbone spacing between the radical carbons. Some examples of $(C_2\text{-}C_{20})$alkylene α,ω-diradicals include ethan-1,2-diyl (i.e., —$CH_2CH_2$), propan-1,3-diyl (i.e., —$CH_2CH_2CH_2$—), 2-methylpropan-1,3-diyl (i.e., $CH_2CH(CH_3)CH_2$—). Some examples of $(C_1\text{-}C_{40})$arylene α,ω-diradicals include phenyl-1,4-diyl, napthalen-2,6-diyl, or napthalen-3,7-diyl.

The term "$(C_1\text{-}C_{40})$alkylene" means a saturated straight chain or branched chain diradical (i.e., the radicals are not on ring atoms) of from 1 to 40 carbon atoms that is unsubstituted or substituted by one or more $R^S$. Examples of unsubstituted $(C_1\text{-}C_{40})$alkylene are unsubstituted $(C_1\text{-}C_{20})$alkylene, including unsubstituted —$CH_2CH_2$—, —$(CH_2)_3$—, —$(CH_2)_4$—, —$(CH_2)_5$—, —$(CH_2)_6$—, —$(CH_2)_7$—, —$(CH_2)_8$—, —$CH_2C^*(H)(CH_3)$, and —$(CH_2)_4C^*(H)(CH_3)$, in which "C*" denotes a carbon atom from which a hydrogen atom is removed to form a secondary or tertiary alkyl radical. Examples of substituted $(C_1\text{-}C_{40})$alkylene are substituted $(C_1\text{-}C_{20})$alkylene, and —$CF_2$—, —$C(O)$—. The term "$(C_3\text{-}C_{40})$cycloalkylene" means a cyclic diradical (i.e., the radicals are on ring atoms) of from 3 to 40 carbon atoms that is unsubstituted or substituted by one or more $R^S$.

The term "heteroatom," refers to an atom other than hydrogen or carbon. The term "heteroatom group" refers to a heteroatom or to a chemical group containing one or more heteroatoms. Examples of heteroatom groups include, but are not limited to, O, S, S(O), $S(O)_2$, $Si(R^C)_3$, $P(R^P)_2$, —$N(R^N)_2$, —$N=C(R^C)_2$, —$Ge(R^C)_2$—, or —$Si(R^C)_2$—, where each $R^C$ and each $R^P$ is, independently, an unsubstituted $(C_1\text{-}C_{30})$hydrocarbyl or —H, and where each $R^N$ is unsubstituted $(C_1\text{-}C_{30})$hydrocarbyl.

The term "heterohydrocarbon" refers to a molecule or molecular framework in which one or more carbon atoms are replaced with a heteroatom. The term "$(C_1\text{-}C_{40})$heterohydrocarbyl" means a heterohydrocarbon radical of from 1 to 40 carbon atoms, and the term "$(C_1\text{-}C_{40})$heterohydrocarbylene" means a heterohydrocarbon diradical of from 1 to 40 carbon atoms, and each heterohydrocarbon has one or more heteroatoms. The radical of the heterohydrocarbyl is on a carbon atom or a heteroatom, and diradicals of the heterohydrocarbyl may be on: (1) one or two carbon atoms, (2) one or two heteroatoms, or (3) a carbon atom and a heteroatom. Each $(C_1\text{-}C_{40})$heterohydrocarbyl and $(C_1\text{-}C_{40})$heterohydrocarbylene may be unsubstituted or substituted (by one or more $R^S$), aromatic or non-aromatic, saturated or unsaturated, straight chain or branched chain, cyclic (including mono- and poly-cyclic, fused and non-fused polycyclic), or acyclic.

The $(C_1\text{-}C_{40})$heterohydrocarbyl may be unsubstituted or substituted. Non-limiting examples of the $(C_1\text{-}C_{40})$heterohydrocarbyl include $(C_1\text{-}C_{40})$heteroalkyl, $(C_1\text{-}C_{40})$hydrocarbyl-O—, $(C_1\text{-}C_{40})$hydrocarbyl-S—, $(C_1\text{-}C_{40})$hydrocarbyl-S(O)—, $(C_1\text{-}C_{40})$hydrocarbyl-$S(O)_2$—, $(C_1\text{-}C_{40})$hydrocarbyl-$Si(R^C)_2$—, $(C_1\text{-}C_{40})$hydrocarbyl-$N(R^N)$—, $(C_1\text{-}C_{40})$hydrocarbyl-$P(R^P)$—, $(C_2\text{-}C_{40})$heterocycloalkyl, $(C_2\text{-}C_{19})$heterocycloalkyl-$(C_1\text{-}C_{20})$alkylene, $(C_3\text{-}C_{20})$cycloalkyl-$(C_1\text{-}C_{19})$heteroalkylene, $(C_2\text{-}C_{19})$heterocycloalkyl-$(C_1\text{-}C_{20})$heteroalkylene, $(C_1\text{-}C_{50})$heteroaryl, $(C_1\text{-}C_{19})$heteroaryl-$(C_1\text{-}C_{20})$alkylene, $(C_6\text{-}C_{20})$aryl-$(C_1\text{-}C_{19})$heteroalkylene, or $(C_1\text{-}C_{19})$heteroaryl-$(C_1\text{-}C_{20})$heteroalkylene.

The term "$(C_1\text{-}C_{40})$heteroaryl" means an unsubstituted or substituted (by one or more $R^S$) mono-, bi- or tricyclic heteroaromatic hydrocarbon radical of from 1 to 40 total carbon atoms and one or more heteroatoms, and the mono-, bi- or tricyclic radical comprises 1, 2 or 3 rings, respectively, wherein the 2 or 3 rings independently are fused or non-fused and at least one of the 2 or 3 rings is heteroaromatic. Other heteroaryl groups (e.g., $(C_x\text{-}C_y)$heteroaryl generally, such as $(C_1\text{-}C_{12})$heteroaryl) are defined in an analogous manner as having from x to y carbon atoms (such as 1 to 12 carbon atoms) and being unsubstituted or substituted by one or more than one $R^S$. The monocyclic heteroaromatic hydrocarbon radical is a 5-membered or 6-membered ring. The 5-membered ring has 5 minus h carbon atoms, wherein h is the number of heteroatoms and may be 1, 2, or 3; and each heteroatom may be O, S, N, or P. Examples of 5-membered ring heteroaromatic hydrocarbon radical are pyrrol-1-yl; pyrrol-2-yl; furan-3-yl; thiophen-2-yl; pyrazol-1-yl; isoxazol-2-yl; isothiazol-S-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl. The 6-membered ring has 6 minus h carbon atoms, wherein h is the number of heteroatoms and may be 1 or 2, and the heteroatoms may be N or P. Examples of 6-membered ring heteroaromatic hydrocarbon radical are pyridine-2-yl; pyrimidin-2-yl; and pyrazin-2-yl. The bicyclic heteroaromatic hydrocarbon radical can be a fused 5,6- or 6,6-ring system. Examples of the fused 5,6-ring system bicyclic heteroaromatic hydrocarbon radical are indol-1-yl; and benzimidazole-1-yl. Examples of the fused 6,6-ring system bicyclic heteroaromatic hydrocarbon radical are quinolin-2-vi; and isoquinolin-1-yl. The tricyclic heteroaromatic hydrocarbon radical can be a fused 5,6,5-; 5,6,6-; 6,5,6-; or 6,6,6-ring system. An example of the fused 5,6,5-ring system is 1,7-dihydropyrrolo[3,2-f]indol-1-yl. An example of the fused 5,6,6-ring system is 11-benzo[f] indol-1-yl. An example of the fused 6,5,6-ring system is 91H-carbazol-9-yl. An example of the fused 6,6,6-ring system is acrydin-9-yl.

The aforementioned heteroalkyl may be saturated straight or branched chain radicals containing $(C_1\text{-}C_{40})$ carbon atoms, or fewer carbon atoms and one or more of the heteroatoms. Likewise, the heteroalkylene may be saturated straight or branched chain diradicals containing from 1 to 50 carbon atoms and one or more than one heteroatoms. The heteroatom groups may include $Si(R^C)_3$, $Ge(R^C)_3$, $Si(R^C)_2$, $Ge(R^C)_2$, $P(R^P)_2$, $P(R^P)$, $N(R^N)_2$, $N(R^N)$, N, O, $OR^C$, S, $SR^C$, S(O), and $S(O)_2$. The heteroalkyl and heteroalkylene groups are unsubstituted or substituted by one or more $R^S$.

Examples of unsubstituted $(C_2\text{-}C_{40})$heterocycloalkyl are unsubstituted $(C_2\text{-}C_{20})$-heterocycloalkyl, unsubstituted $(C_2\text{-}C_{10})$heterocycloalkyl, aziridin-1-yl, oxetan-2-yl, tetrahydrofuran-3-yl, pyrrolidin-1-yl, tetrahydrothiophen-S,S-dioxide-2-yl, morpholin-4-yl, 1,4-dioxan-2-yl, hexahydroazepin-4-yl, 3-oxa-cyclooctyl, 5-thio-cyclononyl, and 2-azacyclodecyl.

The term "halogen atom" or "halogen" means the radical of a fluorine atom (F), chlorine atom (Cl), bromine atom (Br), or iodine atom (I). The term "halide" means anionic form of the halogen atom: fluoride ($F^-$), chloride ($C^-$), bromide ($Br^-$), or iodide ($I^-$).

The term "procatalyst" refers to a compound that has catalytic activity when combined with an activator. The term "activator" refers to a compound that chemically reacts with a procatalyst, in a manner that converts the procatalyst to a catalytically active catalyst. As used herein, the terms "cocatalyst" and "activator" are interchangeable terms.

In some embodiments, the catalyst systems, comprising metal-ligand complexes of Structure 1 and Structure 2, may each be rendered catalytically active by any technique known in the art for activating metal-based catalysts of olefin polymerization reactions. For example, metal-ligand complexes of Structure 1 and Structure 2 may each be rendered catalytically active by contacting the complex to, or combining the complex with, an activating cocatalyst. Suitable activating cocatalysts for use herein include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). A suitable activating technique is bulk electrolysis. Combinations of one or more of the foregoing activating cocatalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Examples of polymeric or oligomeric alumoxanes include methylalumoxane, triisobutylaluminum-modified methylalumoxane, and isobutylalumoxane.

Lewis acid activators (cocatalysts) include Group 13 metal compounds containing from 1 to 3 ($C_1$-$C_{20}$)hydrocarbyl substituents as described herein. In one embodiment, Group 13 metal compounds are tri(($C_1$-$C_{20}$)hydrocarbyl)-substituted-aluminum or tri(($C_1$-$C_{20}$)hydrocarbyl)-boron compounds. In other embodiments, Group 13 metal compounds are tri(hydrocarbyl)-substituted-aluminum, tri(hydrocarbyl)-boron compounds, tri(($C_1$-$C_{10}$)alkyl)aluminum, tri(($C_6$-$C_{18}$)aryl)boron compounds, and halogenated (including perhalogenated) derivatives thereof. In further embodiments, Group 13 metal compounds are tris(fluoro-substituted phenyl)boranes, tris(pentafluorophenyl)borane. In some embodiments, the activating cocatalyst is a tetrakis (($C_1$-$C_{20}$)hydrocarbyl borate (e.g., trityl tetrafluoro-borate) or a tri(($C_1$-$C_{20}$)hydrocarbyl)ammonium tetrakis(($C_1$-$C_{20}$) hydrocarbyl)borate (e.g., bis(octadecyl)methylammonium tetrakis(pentafluorophenyl)borate). As used herein, the term "ammonium" means a nitrogen cation that is a (($C_1$-$C_{20}$) hydrocarbyl)$_4$N$^+$ a (($C_1$-$C_{20}$)hydrocarbyl)$_3$N(H)$^+$, a (($C_1$-$C_{20}$)hydrocarbyl)$_2$N(H)$_2^+$, ($C_1$-$C_{20}$)hydrocarbylN(H)$_3^+$, or N(H)$_4^+$, wherein each ($C_1$-$C_{20}$)hydrocarbyl, when two or more are present, may be the same or different.

Combinations of non-polymeric, non-coordinating, ion-forming compounds and polymeric or oligomeric alumoxanes include mixtures comprising a combination of a polymeric or oligomeric alumoxanes (also known as aluminoxanes) and a halogenated tetrakis borate compound, especially a bis(hydrogenated tallow alkyl)methyl tetrakis(pentafluorophenyl)borate($1^-$) amine. Ratios of numbers of moles of (metal-ligand complexes):(bis(hydrogenated tallow alkyl)methyl tetrakis(pentafluorophenyl)borate($1^-$) amine):(alumoxane) [e.g., (Group 4 metal-ligand complexes):(tetrakis(pentafluorophenyl-borate):(alumoxane)] may be from 1:1:1 to 1:10:500, in other embodiments, from 1:1:1.5 to 1:5:100. Other embodiments are combinations of neutral Lewis acid mixtures with a polymeric or oligomeric alumoxane, and combinations of a single neutral Lewis acid, especially tris(pentafluoro-phenyl)borane with a polymeric or oligomeric alumoxane.

The catalyst system comprising the metal-ligand complexes of Structure 1 and Structure 2 may be activated to form an active catalyst composition by combination with one or more cocatalysts, for example, a cation forming cocatalyst, a strong Lewis acid, or combinations thereof. Suitable activating cocatalysts include polymeric or oligomeric aluminoxanes, especially methyl aluminoxane, as well as inert, compatible, noncoordinating, ion forming compounds. Exemplary suitable cocatalysts include, but are not limited to, modified methyl aluminoxane (MMAO), bis(hydrogenated tallow alkyl)methyl tetrakis(pentafluorophenyl)borate($1^-$) amine, and combinations thereof.

In some embodiments, one or more of the foregoing activating cocatalysts are used in combination with each other. An especially preferred combination is a mixture of an ammonium borate with an oligomeric or polymeric alumoxane compound. In some embodiments, the ratio of total number of moles of one or more metal-ligand complexes of Structure 1 and Structure 2 to total number of moles of one or more of the activating cocatalysts is at least 1:500, or 1:300, or 1:100, or 1:50, or 1:10, or 1:5. When an alumoxane, alone, is used as the activating cocatalyst, preferably the number of moles of the alumoxane that are employed is at least 10 times the number of combined moles of the metal-ligand complexes of Structure 1 and Structure 2.

It should be understood that the catalyst systems of this disclosure may be embodied in different forms, and should not be construed as limited to the specific embodiments set forth in this disclosure. Rather, embodiments are provided so that this disclosure will be thorough and complete, and will fully convey the scope of the subject matter to those skilled in the art. Specific embodiments of catalyst systems will now be described.

In one embodiment, or a combination of two or more embodiments, each described herein, for Structure 2, Y is either —(CH$_2$)$_n$—, where n=0 to 2, further n=1 or 2, further n=1; —CR$^a$R$^b$—, where R$^a$ and R$^b$ are each independently ($C_1$-$C_{40}$)hydrocarbyl, ($C_1$-$C_{40}$)heterohydrocarbyl, or —H—; —Ge(R$^D$)$_2$— or —Si(R$^D$)$_2$—, where each R$^D$ is independently selected from the group consisting of —H, ($C_1$-$C_{40}$)hydrocarbyl and ($C_1$-$C_{40}$)heterohydrocarbyl.

In one embodiment, or a combination of two or more embodiments, each described herein, for Structure 1, each of —Z$^1$— and —Z$^2$— is —O—.

In one embodiment, or a combination of two or more embodiments, each described herein, for Structure 2, each of —Z$^1$— and —Z$^2$— is —O—.

In one embodiment, or a combination of two or more embodiments, each described herein, for Structure 1. R$^1$ and R$^8$ are identical, and selected from the group consisting of radicals having formula (I), radicals having formula (II), and radicals having formula (III).

In one embodiment, or a combination of two or more embodiments, each described herein, for Structure 2, R$^1$ and R$^8$ are identical, and selected from the group consisting of radicals having formula (I), radicals having formula (II), and radicals having formula (II).

In one embodiment, or a combination of two or more embodiments, each described herein, for Structure 1, at least one of $R^1$ or $R^8$ is selected from a radical having formula (II) or a radical having formula (I).

In one embodiment, or a combination of two or more embodiments, each described herein, for Structure 2, at least one of $R^1$ or $R^8$ is selected from a radical having formula (II).

In one embodiment, or a combination of two or more embodiments, each described herein, for Structure 1, L is selected from the following:

i) —CH$_2$Si(R$^a$)(R$^b$)CH$_2$— or —CH$_2$Ge(R$^a$)(R$^b$)CH$_2$—, where R$^a$ and R$^b$ are each, independently, a (C$_1$-C$_{30}$)hydrocarbyl or a (C$_1$-C$_{30}$)heterohydrocarbyl;

ii) 1,3-dimethylpropan-1,3-diyl;

iii) bis(methylene)cyclohexan-1,2-diyl;

iv) propan-1,4-diyl; or v) butan-1,4-diyl.

In one embodiment, or a combination of two or more embodiments, each described herein, for Structure 2, Y is selected from the following:

i) —SiR$^c$R$^d$—, or —GeR$^c$R$^d$— where R$^c$ and R$^d$ are each, independently, a (C$_1$-C$_{30}$)hydrocarbyl or a (C$_1$-C$_{30}$)heterohydrocarbyl;

ii) —(CH$_2$)$_n$—, where n=0 to 2, further n=1 or 2, further n=1; or iii) —CR$^a$R$^b$—, where R$^a$ and R$^b$ are each, independently, a (C$_1$-C$_{30}$)hydrocarbyl, a (C$_1$-C$_{30}$)heterohydrocarbyl, or —H.

In one embodiment, or a combination of two or more embodiments, each described herein, for Structure 1, R2=R4=R5=R7=R9=R1=R12=R13=R14=R16=H.

In one embodiment, or a combination of two or more embodiments, each described herein, for Structure 2, R2=R4=R5=R7=R9=R1=R12=R13=R14=R16=H.

In one embodiment, or a combination of two or more embodiments, each described herein, Structure 1 is selected from the following structures 1a-1c:

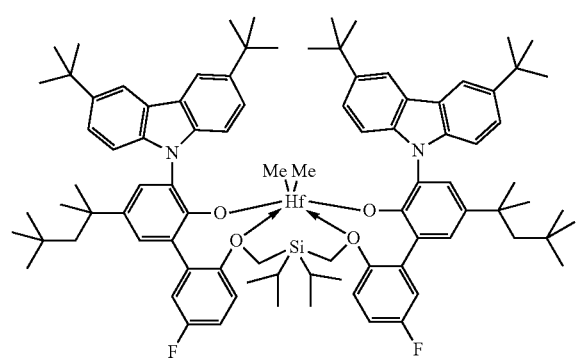

(1a)

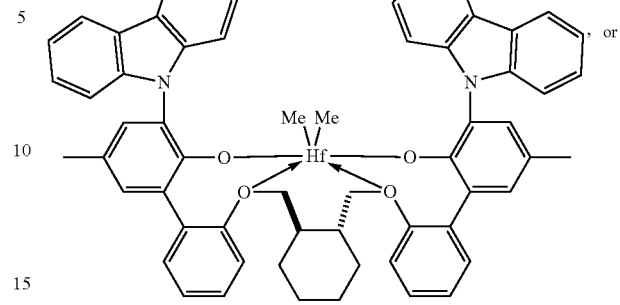

(1b)

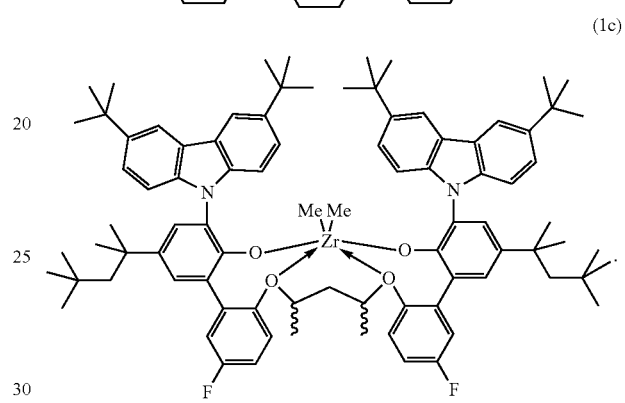

(1c)

In one embodiment, or a combination of two or more embodiments, each described PG-herein, Structure 2 is selected from the following, structures 2a or 2b:

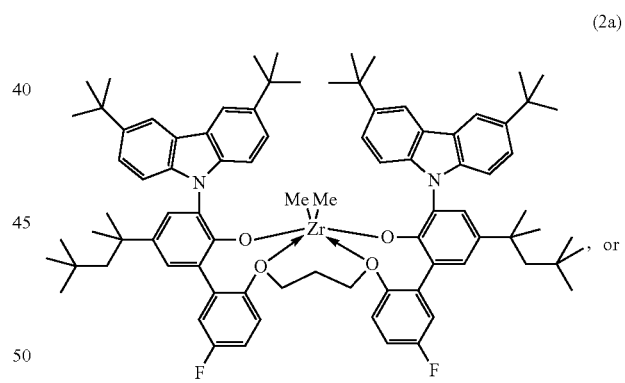

(2a)

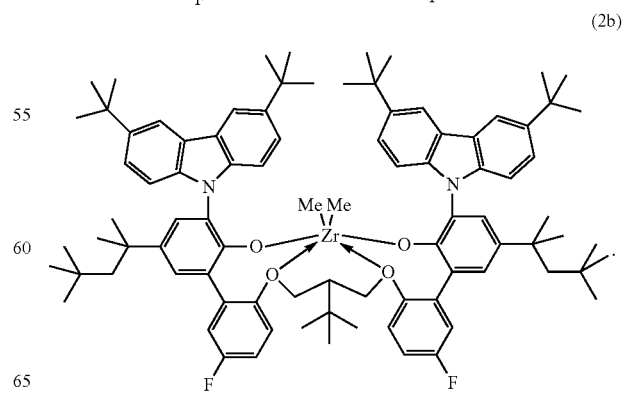

(2b)

In one embodiment, or a combination of two or more embodiments, each described herein, the process has an overall catalyst efficiency $\geq 2.8 \times 10^6$, $\geq 3.0 \times 10^6$, or $\geq 3.2 \times 10^6$, or $\geq 3.4 \times 10^6$, or $\geq 3.6 \times 10^6$ [(gram alpha composition) per (gram total catalyst metal)], at a reactor temperature $\geq 150°$ C., or $\geq 155°$ C., or $\geq 160°$ C., or $\geq 165°$ C.

In one embodiment, or a combination of two or more embodiments, each described herein, the process has an overall catalyst efficiency $\geq 2.8 \times 10^6$, $\geq 3.0 \times 10^6$, or $\geq 3.2 \times 10^6$, or $\geq 3.4 \times 10^6$, or $\geq 3.6 \times 10^6$ [(gram alpha composition) per (gram total catalyst metal)], at an alpha composition density from 0.855 to 0.890 g/cc, or from 0.860 to 0.890 g/cc, or from 0.865 to 0.890 g/cc, or from 0.865 to 0.885 g/cc (1 cc=1 cm$^3$).

In one embodiment, or a combination of two or more embodiments, each described herein, the mass flow ratio of the (hydrogen reactor feed) to the (ethylene reactor feed) is $\leq 6.00 \times 10^{-4}$ g/g, or $\leq 5.50 \times 10^{-4}$ g/g, or $\leq 5.00 \times 10^{-4}$ g/g, or $\leq 4.50 \times 10^{-4}$ g/g.

In one embodiment, or a combination of two or more embodiments, each described herein, the process is run at a reactor temperature $\geq 150°$ C., or $\geq 155°$ C., or $\geq 160°$ C. or $\geq 165°$ C.

Also is provided a composition comprising an alpha composition comprising a first ethylene/alpha-olefin interpolymer fraction and a second ethylene/alpha-olefin interpolymer fraction, and wherein the alpha composition comprises the following properties:

i) an Mz/Mn$\geq 8.0$,
ii) a density from 0.855 to 0.890 g/cc,
iii) a V100 (190° C.)$\leq 600$ Pa·s, and
iv) a V0.1 (190° C.)$\geq 4.000$ Pa·s.

The invention also provides a crosslinked composition formed from the composition of any one embodiment, or a combination of two or more embodiments, each described herein. The invention also provides an article comprising at least one component formed from the composition of any one embodiment, or a combination of two or more embodiments, each described herein.

An inventive composition may comprise a combination of two or more embodiments, as described herein. An alpha composition may comprise a combination of two or more embodiments, as described herein.

The alpha composition comprises at least two ethylene/alpha-olefin interpolymer fractions that differ in one or more polymer properties. Each ethylene/alpha-olefin interpolymer fraction independently comprises, in polymerize form, ethylene, and an alpha-olefin, and optionally may comprise a polyene, and further a nonconjugated polyene. The alpha-olefin may be either an aliphatic or an aromatic compound. The alpha-olefin is preferably a $C_3$-$C_{20}$ aliphatic compound, preferably a $C_3$-$C_{16}$ aliphatic compound, and more preferably a $C_3$-$C_{10}$ aliphatic compound. Preferred $C_3$-$C_{10}$ aliphatic alpha-olefins include propylene, 1-butene, 1-hexene, 1-octene and 1-decene, and more preferably 1-octene. Suitable examples of nonconjugated polyenes include straight chain acyclic dienes, such as 1,4-hexadiene and 1,5-heptadiene; branched chain acyclic dienes, such as 5-methyl-1, 4-hexadiene, 2-methyl-1,5-hexadiene. 6-methyl-1,5-heptadiene, 7-methyl-1,6-octadiene, 3,7-dimethyl-1,6-octadiene, 3,7-dimethyl-1,7-octadiene, 5,7-dimethyl-1,7-octadiene. 1,9-decadiene, and mixed isomers of dihydromyrcene; single ring alicyclic dienes such as 1,4-cyclo-hexadiene, 1,5-cyclooctadiene and 1,5-cyclodo-decadiene; multi-ring alicyclic fused and bridged ring dienes, such as tetrahydroindene, methyl tetrahydro-indene; alkenyl, alkylidene, cycloalkenyl and cycloalkylidene norbornenes such as 5-methylene-2-norbornene (MNB), 5-ethylidene-2-norbornene (ENB), 5-vinyl-2-norbornene (VNB), 5-propenyl-2-norbornene, 5-isopropylidene-2-norbornene, 5-(4-cyclopentenyl)-2-norbornene, and 5-cyclohexylidene-2-norbornene. The polyene is preferably a nonconjugated diene selected from ENB, VNB and dicyclopentadiene, and preferably ENB.

In one embodiment, or a combination of two or more embodiments, each described herein, an inventive composition further comprises a thermoplastic polymer, different from each of the first and second interpolymer fractions, independently, in one or more features, such as monomer(s) types and/or amounts, Mn, Mw, Mz, MWD, V0.1, V100, ER (=V0.1/V100), or any combination thereof. Polymers include, but are not limited to, ethylene-based polymers, propylene-base polymers, and olefin multi-block interpolymers. Suitable ethylene-base polymers include, but are not limited to, high density polyethylene (HDPE), linear low density polyethylene (LLDPE), very low density polyethylene (VLDPE), ultra-low density polyethylene (ULDPE), homogeneously branched linear ethylene-based polymers, and homogeneously branched substantially linear ethylene-based polymers (that is homogen-eously branched, long chain branched ethylene polymers). Examples of propylene-base polymers include polypropylene homopolymers and propylene/ethylene copolymers.

Definitions

Unless stated to the contrary, implicit from the context, or customary in the art, all parts and percents are based on weight, and all test methods are current as of the filing date of this disclosure.

The term "composition," as used herein, includes a mixture of materials, which comprise the composition, as well as reaction products and decomposition products formed from the materials of the composition. Any reaction product or decomposition product is typically present in trace or residual amounts.

The term "polymer," as used herein, refers to a polymeric compound prepared by polymerizing monomers, whether of the same or a different type. The generic term polymer thus, includes the term homopolymer (employed to refer to polymers prepared from only one type of monomer, with the understanding that trace amounts of impurities can be incorporated into the polymer structure), and the term interpolymer as defined hereinafter. Trace amounts of impurities, such as catalyst residues, can be incorporated into and/or within the polymer. Typically, a polymer is stabilized with very low amounts ("ppm" amounts) of one or more stabilizers.

The term "interpolymer," as used herein, refers to polymer prepared by the polymerization of at least two different types of monomers. The term interpolymer thus includes the term copolymer (employed to refer to polymers prepared from two different types of monomers) and polymers prepared from more than two different types of monomers.

The term "propylene-based polymer," as used herein, refers to a polymer that comprises, in polymerized form, a majority weight percent of propylene (based on the weight of the polymer), and optionally may comprise one or more comonomers.

The term "ethylene-based polymer," as used herein, refers to a polymer that comprises, in polymerized form, 50 wt % or a majority weight percent of ethylene (based on the weight of the polymer), and optionally may comprise one or more comonomers.

The term "ethylene/alpha-olefin interpolymer," as used herein, refers to a random interpolymer that comprises, in polymerized form, ethylene and an alpha-olefin. In one embodiment, the "ethylene/alpha-olefin interpolymer," comprises, in polymerized form, 50 wt % or a majority weight percent of ethylene (based on the weight of the interpolymer).

The term "ethylene/alpha-olefin/nonconjugated polyene interpolymer," as used herein, refers to a random interpolymer that comprises, in polymerized form, ethylene, an alpha-olefin, and a nonconjugated polyene (for example, a nonconjugated diene). In one embodiment, the "ethylene/alpha-olefin/nonconjugated polyene interpolymer," comprises, in polymerized form, 50 wt % or a majority weight percent of ethylene (based on the weight of the interpolymer).

The term, "ethylene/alpha-olefin copolymer," is used herein, refers to a random copolymer that comprises, in polymerized form, 50 wt % or a majority weight percent of ethylene monomer (based on the weight of the copolymer), and an alpha-olefin, as the only two monomer types.

The ter c "solar cell (or photovoltaic cell)," as used herein, refers to a device that converts solar radiation into electricity. Solar cells are typically presented in an array pattern.

The term "solar cell module (or solar panel or solar module)," as used herein, refers to a photovoltaic panel that comprises an assembly of solar cells.

The term "reaction mixture," as used herein, refers to a mixture comprising one or more monomer types, and at least one metal complex. Typically, the reaction mixture also comprises a solvent, one or more cocatalysts and hydrogen ($H_2$).

The term "Overall Catalyst Efficiency (units of 10^6 g polymer composition per g total catalyst metal)," as used herein, in reference to a polymerization process, refers to the production rate (for example, lb/hr) of the polymer composition formed during the polymerization process (or polymerization run), divided by the total feed rate (for example, lb/hr) of the catalyst metals (for example, the metal(s) from one or more metal complexes) used during the same polymerization process (or polymerization run). Typically, the polymerization is a steady state process.

The terms "comprising," "including," "having," and their derivatives, are not intended to exclude the presence of any additional component, step or procedure, whether the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure, not specifically delineated or listed.

Listing of Some Composition Features

A] A process to prepare an alpha composition comprising a first ethylene/alpha-olefin/interpolymer fraction and a second ethylene/alpha-olefin/interpolymer fraction; said process comprising polymerizing, in one reactor, a reaction mixture, comprising ethylene, an alpha-olefin, a metal complex selected from a) below, and a metal complex selected from b) below:
  a) a biphenyl phenol metal complex selected from the following Structure 1, as described above in the Summary of the Invention (SOI):

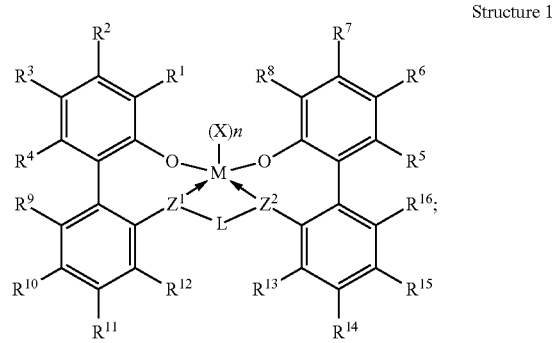

Structure 1 b) a biphenyl phenol metal complex selected from Structure 2, as described above in the SOI:

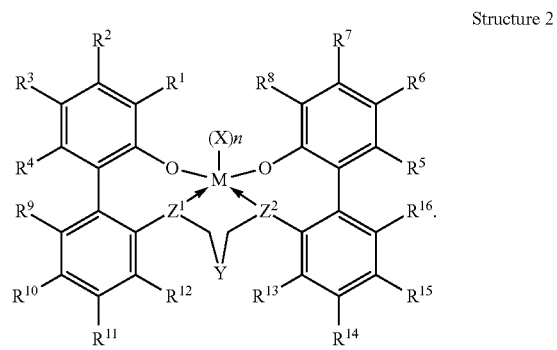

Structure 2

B] The process of A] above, wherein for Structure 1, each of —$Z^1$— and —$Z^2$— is —O—.

C] The process of A] or B] above, wherein for Structure 2, each of —$Z^1$— and —$Z^2$— is —O—.

D] The process of any one of A]-C] (A] through C]) above, wherein for Structure 1, at least one of $R^1$ and $R^8$ is a radical having formula (I), a radical having formula (II), or a radical having formula (III).

E] The process of any one of A]-D] above, wherein for Structure 2, at least one of $R^1$ and $R^8$ is a radical having formula (I), a radical having formula (II), or a radical having formula (III).

F] The process of any one of A]-E] above, wherein for Structure 1, $R^1$ and $R^8$ are identical, and selected from the group consisting of radicals having formula (I), radicals having formula (II), and radicals having formula (III).

G] The process of any one of A]-F] above, wherein for Structure 2, $R^1$ and $R^8$ are identical, and selected from the group consisting of radicals having formula (I), radicals having formula (II), and radicals having formula (III).

H] The process of any one of A]-G] above, wherein for Structure 1, at least one of $R^1$ or $R^8$ is selected from a radical having formula (II) or a radical having formula (I), and further both $R^1$ or $R^8$ are selected from a radical having formula (II) or a radical having formula (I).

I] The process of any one of A]-H] above, wherein for Structure 2, at least one of $R^1$ or $R^8$ is selected from a radical having formula (II) or a radical having formula (I), and further both $R^1$ or $R^8$ are selected from a radical having formula (II) or a radical having formula (I).

J] The process of any one of A]-I] above, wherein for Structure 1, $R^1$=$R^8$=a radical having formula (II).

K] The process of J] above, wherein for formula (II) of Structure 1, $R^{43}=R^{46}$=an unsubstituted alkyl or H, further an unsubstituted ($C_1$-$C_{10}$) alkyl or H, further an unsubstituted ($C_1$-$C_8$) alkyl or H, further an unsubstituted ($C_1$-$C_6$) alkyl or H, further an unsubstituted ($C_1$-$C_4$) alkyl or H, further t-butyl or H.

L] The process of J] or K] above, wherein for formula (II), $R^{43}=R^{46}$=an unsubstituted alkyl, further an unsubstituted ($C_1$-$C_{10}$) alkyl, further an unsubstituted ($C_1$-$C_8$) alkyl, further an unsubstituted ($C_1$-$C_6$) alkyl, further an unsubstituted ($C_1$-$C_4$) alkyl, further t-butyl.

M] The process of any one of J]-L] above, wherein for formula (II), $R^{41}=R^{42}=R^{44}=R^{45}=R^{47}=R^{48}$=H.

N] The process of any one of A]-M] above, wherein for Structure 2. $R^1=R^S$=a radical having formula (II).

O] The process of N] above, wherein for formula (II) of Structure 2, $R^{43}=R^{46}$=an unsubstituted alkyl, further an unsubstituted ($C_1$-$C_{10}$) alkyl, further an unsubstituted ($C_1$-$C_8$) alkyl, further an unsubstituted ($C_1$-$C_6$) alkyl, further an unsubstituted ($C_1$-$C_4$) alkyl, further t-butyl.

P] The process of N] or O] above, wherein for formula (II), $R^{41}=R^{42}=R^{44}=R^{45}=R^{47}=R48$=H.

Q] The process of any one of A]-P] above, wherein for Structure 1. L is selected from the following:
  i) —$CH_2Si(R^a)(R^b)CH_2$— or —$CH_2Ge(R^a)(R^b)CH_2$—, where $R^a$ and $R^b$ are each, independently, a ($C_1$-$C_{30}$) hydrocarbyl or a ($C_1$-$C_{30}$)heterohydrocarbyl;
  ii) 1,3-dimethylpropan-1,3-diyl;
  iii) bis(methylene)cyclohexan-1,2-diyl;
  iv) propan-1,3-diyl; or
  iv) butan-1,4-diyl.

R] The process of any one of A]-Q] above, wherein for Structure 1, L is selected from the following:
  i) —$CH_2Si(R^a)(R^b)CH_2$—, where $R^a$ and $R^b$ are each, independently, an unsubstituted ($C_1$-$C_{10}$)alkyl, further an unsubstituted ($C_1$-$C_8$) alkyl, further an unsubstituted ($C_1$-$C_6$) alkyl, further an unsubstituted ($C_1$-$C_4$) alkyl 1, further an unsubstituted ($C_1$-$C_3$) alkyl;
  ii) 1,3-dimethylpropan-1,3-diyl; or
  iii) bis(methylene)cyclohexan-1,2-diyl.

S] The process of any one of A]-R] above, wherein for Structure 2, Y is selected from the following:
  i) —$SiR^cR^d$—, or —$GeR^cR^d$— where $R^c$ and $R^d$ are each, independently, a ($C_1$-$C_{30}$)hydrocarbyl or a ($C_1$-$C_{30}$) heterohydrocarbyl;
  ii) —$(CH_2)_n$—, where n=0 to 2, further n=1 or 2, further n=1; or
  iii) —$CR^aR^b$—, where $R^a$ and $R^b$ are each, independently, a ($C_1$-$C_{30}$)hydrocarbyl, a ($C_1$-$C_{30}$)heterohydrocarbyl, or —H.

T] The process of any one of A]-S] above, wherein for Structure 2, Y is selected from the following:
  i) —$SiR^cR^d$—, or —$GeR^cR^d$— where $R^c$ and $R^d$ are each, independently, an unsubstituted ($C_1$-$C_{10}$) alkyl, further an unsubstituted ($C_1$-$C_8$) alkyl, further an unsubstituted ($C_1$-$C_6$) alkyl, further an unsubstituted ($C_1$-$C_4$) alkyl, further an unsubstituted ($C_1$-$C_3$) alkyl;
  ii) —$(CH_2)_n$—, where n=0 to 2, further n=1 or 2, further n=1; or
  iii) —$CR^aR^b$—, where $R^a$ and $R^b$ are each, independently, H or an unsubstituted ($C_1$-$C_{10}$) alkyl, further H or an unsubstituted ($C_1$-$C_8$) alkyl, further H or an unsubstituted ($C_1$-$C_6$) alkyl, further H or an unsubstituted ($C_1$-$C_4$) alkyl.

U] The process of any one of A]-T] above, wherein for Structure 2, Y is selected from the following:
  ii) —$(CH_2)_n$—, where n=0 to 2, further n=1 or 2, further n=1; or
  iii) —$CR^aR^b$—, where $R^a$ and $R^b$ are each, independently, H, or an unsubstituted ($C_1$-$C_{10}$) alkyl, further H or an unsubstituted ($C_1$-$C_8$) alkyl, further H or an unsubstituted ($C_1$-$C_6$) alkyl, further H— or an unsubstituted ($C_1$-$C_4$) alkyl.

V] The process of any one of A]-U] above, wherein for Structure 1, n=2, and each X is the same, and is an unsubstituted alkyl.

W] The process of V] above, wherein each X is an unsubstituted ($C_1$-$C_3$) alkyl, further an unsubstituted ($C_1$-$C_2$) alkyl, further methyl.

X] The process of any one of A]-W] above, wherein for Structure 1, R10=R15.

Y] The process of any one of A]-X] above, wherein for Structure 1. R10=R15=H or a halogen, and further H or F.

Z] The process of any one of A]-Y] above, wherein for Structure 1, R10=R15=a halogen, and further F.

AA] The process of any one of A]-Z] above, wherein for Structure 1, R3=R6.

BB] The process of any one of A]-AA] above, wherein for Structure 1, R3=R6=an unsubstituted alkyl.

CC] The process of any one of A]-BB] above, wherein for Structure 1, R3=R6=an unsubstituted ($C_1$-$C_{12}$)alkyl, further an unsubstituted ($C_1$-$C_{10}$)alkyl, further an unsubstituted ($C_1$-$C_8$)alkyl, further methyl or an unsubstituted $C_8$ alkyl.

DD] The process of any one of A]-CC] above, wherein for Structure 1, R2=R4=R5=R7=R9=R11=R12=R13=R14=R16=H.

EE] The process of any one of A]-DD] above, wherein for Structure 2, n=2, and each X is the same, and is an unsubstituted alkyl.

FF] The process of FE] above, wherein each X is an unsubstituted ($C_1$-$C_3$) alkyl, further an unsubstituted ($C_1$-$C_2$) alkyl, further methyl.

GG] The process of any one of A]-FF] above, wherein for Structure 2, R10=R15.

HH] The process of any one of A]-GG] above, wherein for Structure 2, R10=R15=a halogen, and further F.

II] The process of any one of A]-HH] above, wherein for Structure 2. R3=R6.

JJ] The process of any one of A]-II] above, wherein for Structure 2, R3=R6=an unsubstituted alkyl.

KK] The process of any one of A]-JJ] above, wherein for Structure 2, R3=R6=an unsubstituted ($C_1$-$C_{12}$)alkyl, further an unsubstituted ($C_1$-$C_{10}$)alkyl, further an unsubstituted ($C_2$-$C_8$)alkyl, further an unsubstituted ($C_4$-$C_8$)alkyl further an unsubstituted $C_8$ alkyl.

LL] The process of any one of A]-KK] above, wherein for Structure 2, R2=R4=R5=R7=R9=R11=R12=R13=R14=R16=H.

MM] The process of any one of A]-LL] above, wherein for Structure 2, the metal M=Zr.

NN] The process of any one of A]-MM] above, wherein Structure 1 is selected from the following structures (1a)-(1c), each described above in the Detailed Description of the Invention (DDI).

OO] The process of NN] above, wherein Structure 1 is structure (1a), as described above in the DDI.

PP] The process of any one of A]-OO] above, wherein Structure 2 is selected from the following structures (2a) or (2b), each as described above in the DDI.

QQ] The process of PP] above, wherein Structure 2 is structure (2b), as described above in the DDI.

RR] The process of A]-QQ] above, wherein the process has an overall catalyst efficiency $\geq 2.8 \times 10^6$ or $\geq 3.0 \times 10^6$, or ≥3.2×10$^6$, or ≥3.4×10$^6$, or ≥3.6×10$^6$ [(gram alpha composition) per (gram total catalyst metal)], at a reactor temperature ≥150° C., or ≥155° C., or ≥160° C., or ≥165° C.

SS] The process of A]-RR] above, wherein the process has an overall catalyst efficiency ≥2.8×10$^6$, or ≥3.0×10$^6$, or ≥3.2×10$^6$, or ≥3.4×10$^6$, or ≥3.6×10$^6$ [(gram alpha composition) per (gram total catalyst metal)], at an alpha composition density from 0.855 to 0.890 g/cc, or from 0.860 to 0.890 g/cc, or from 0.865 to 0.890 g/cc, or from 0.865 to 0.885 g/cc (1 cc=1 cm$^3$).

TT] The process of A]-SS] above, wherein the process is run at a reactor temperature ≥150° C., or ≥155° C., or ≥160° C., or ≥165° C.

UU] The process of any one of A]-TT] (A] through TT]) above, wherein the mass flow ratio of the (hydrogen reactor feed) to the (ethylene reactor feed) is ≥0.01×10$^{-4}$ g/g, or ≥0.05×10$^{-4}$ g/g, or ≥0.10×10$^{-4}$ g/g, or ≥0.20×10$^{-4}$ g/g, or ≥0.40×10$^{-4}$ g/g, or ≥0.60×10$^{-4}$ g/g, or ≥0.70×10$^{-4}$ g/g.

VV] The process of any one of A]-UU] above, wherein the mass flow ratio of the (hydrogen reactor feed) to the (ethylene reactor feed) is ≤6.00×10$^{-4}$ g/g, or ≤5.50×10$^{-4}$ g/g, or ≤5.00×10$^{-4}$ g/g, or ≤4.50×10$^{-4}$ g/g.

WW] The process of any one of A]-VV] above, wherein the reactor is selected from a continuous stirred tank reactor, a loop reactor, or a plug flow reactor (or tubular reactor), further a continuous stirred tank reactor or a loop reactor, and further continuous stirred tank reactor.

XX] The process of any one of A]-WW] above, wherein the reaction mixture further comprises a solvent.

YY] The process of any one of A]-XX] above, wherein the reaction mixture further comprises one or more cocatalysts.

ZZ] The process of any one of A]-YY] above, wherein the reaction mixture further comprises hydrogen ($H_2$).

A3] The process of any one of A]-ZZ] above, wherein the process is a solution polymerization process.

B3] A composition comprising the alpha composition formed by the process of any one of A]-A3] above.

C3] The composition of B3] above, where the alpha composition comprises the following properties:
  i) an Mz/Mn≥8.0,
  ii) a density from 0.855 to 0.890 g/cc,
  iii) a V100 (190° C.)≤600 Pa·s, and
  iv) a V0.1 (190° C.)≥4,000 Pa·s.

D3] A composition comprising an alpha composition comprising a first ethylene/alpha-olefin interpolymer fraction and a second ethylene/alpha-olefin interpolymer fraction, and wherein the alpha composition comprises the following properties:
  i) an Mz/Mn≥8.0,
  ii) a density from 0.855 to 0.890 g/cc,
  iii) a V100 (190° C.)≤600 Pa·s, and
  iv) a V0.1 (190° C.)≥4,000 Pa·s.

E3] The composition any one of B3]-D3] above, wherein the alpha composition has a Mz/Mn≥8.2, or ≥8.4, or ≥8.6, or ≥8.8, or ≥9.0, or ≥10.0, or ≥12.0, or ≥14.0, or ≥16.0.

F3] The composition of any one of B3]-E3], wherein the alpha composition has a Mz/Mn≤60.0, or ≤55.0, or ≤50.0, or ≤40.0.

G3] The composition of any one of B3]-F3] above, wherein the alpha composition has a density ≥0.856 g/cc, or ≥0.857 g/cc, or ≥0.858 g/cc, or ≥0.859 g/cc, or ≥0.860 g/cc, or ≥0.861 g/cc, or ≥0.862 g/cc, or ≥0.863 g/cc, or ≥0.864 g/cc, or ≥0.865 g/cc, or ≥0.866 g/cc.

H3] The composition of any one of B3]-G3] above, wherein the alpha composition has a density ≤0.889 g/cc, or ≤0.888 g/cc, or ≤0.887 g/cc, or ≤0.886 g/cc, or ≤0.885 g/cc, or ≤0.884 g/cc, or ≤0.883 g/cc, or ≤0.882 g/cc (1 cc=1 cm$^3$).

I3] The composition of any one of B3]—H3] above, wherein the alpha composition has a V100 (100 rad/s, 190° C.)≥100 Pa·s or ≥120 Pa·s, or ≥140 Pa·s, or ≥160 Pa·s, or ≥180 Pa·s, or ≥200 Pa·s, or ≥220 Pa·s.

J3] The composition of any one of B3]-I3] above, wherein the alpha composition has a V100 (100 rad/s, 190° C.)≤580 Pa·s, or ≤570 Pa·s, or ≤560 Pa·s, or ≤550 Pa·s, ≤ or 540 Pa·s, or ≤530 Pa·s, or ≤520 Pa·s.

K3] The composition of any one of B3]-J3] above, wherein the alpha composition has a V0.1 (0.1 rad/s, 190° C.)≥4,100 Pa·s, or ≥4,200 Pa·s, or ≥4,300 Pa·s, or ≥4,400 Pa·s.

L3] The composition of any one of B3]-K3] above, wherein the alpha composition has a V0.1 (0.1 rad/s, 190° C.)≤28.000 Pa·s, or ≤26,000 Pa·s, or ≤24,000 Pa·s, or ≤22,000 Pa·s, or ≤ or 20,000 Pa·s, or ≤18,000 Pa·s.

M3] The composition of any one of B3]-L3] above, wherein the alpha composition has a Rheology Ratio (V0.1/V100, 190° C.)≥7.00, or ≥7.50, or ≥8.00, or ≥8.50.

N3] The composition of any one of B3]-M3] above, wherein the alpha composition has a Rheology Ratio (V0.1/V100, 190° C.)≤64.0, or ≤62.0, or ≤60.0, or ≤58.0, or ≤56.0.

O3] The composition of any one of 13]-N3] above, wherein the alpha composition has a melt index (I2)≥0.5 g/10 min≥1.0 g/10 min, or ≥1.1 g/10 min, or ≥1.2 g/10 min, or ≥1.3 g/10 min, or ≥1.4 g/10 min, or ≥1.5 g/10 min.

P3] The composition of any one of B3]-O3] above, wherein the alpha composition has a melt index (I2)≤50 g/10 min, or ≤40 g/10 Min, or ≤30 g/10 min, or 25 g/10 min, or ≤20 g/10 min, or ≤18 g/10 min, or ≤16 g/10 min, or ≤14 g/10 min, or ≤12 g/10 min, or ≤10 g/10 min. or ≤8.0 g/10 min.

Q3] The composition of any one of B3]-P3] above, wherein the alpha composition has an I10/I2≥6.0 or ≥6.5, or ≥7.0, or ≥7.5, or ≥8.0, or ≥8.5, or ≥9.0, or ≥9.5, or ≥10.0, or ≥10.5, or ≥11.0, or ≥11.5, or ≥12.0, or ≥12.5, or ≥13.0.

R3] The composition of any one of B3]-Q3] above, wherein the alpha composition has an I10/I2≤40.0, or ≤35.0, or ≤32.0, or ≤30.0, or ≤28.0, or ≤26.0, or ≤24.0.

S3] The composition of any one of B3]-R3] above, wherein the alpha composition has a number average molecular weight Mn≥10,000 g/mol, or ≥12,000 g/mol, or ≥14,000 g/mol.

T3] The composition of any one of B3]-S3] above, wherein the alpha composition has a number average molecular weight Mn≤50,000 g/mol, or ≤45,000 g/mol, or ≤40,000 g/mol, or ≤36,000 g/moil, or ≤34,000 g/mol, or ≤32,000 g/mol, or ≤30,000 g/mol.

U3] The composition of any one of B3]-T3] above, wherein the alpha composition has a weight average molecular weight Mw≥60,000 g/mol, or ≥65,000 g/mol, or ≥70,000 g/mol, or ≥75,000 g/mol, or ≥80,000 g/mol, or ≥85,000 g/mol.

V3] The composition of any one of B3]-U3] above, wherein the alpha composition has a weight average molecular weight Mw≤150,000 g/mol, or ≤145,000 g/mol, or ≤140,000 g/mol, or ≤135,000 g/mol, or ≤130,000 g/mol, or ≤125.000 g/mol, or ≤120,000 g/mol.

W3] The composition of any one of B3]-V3] above, wherein the alpha composition has a z average molecular weight Mz≥190,000 g/mol, or ≥200,000 g/mol, or ≥205,000 g/mol, or ≥210,000 g/mol, or ≥215,000 g/mol, or ≥220,000 g/mol, or ≥225,000 g/mol, or ≥230,000 g/mol, or ≥235,000 g/mol, or ≥240,000 g/mol, or ≥245,000 g/mol.

X3] The composition of any one of B31-W3] above, wherein the alpha composition has a z average molecular weight Mz≤600,000 g/mol, or ≤580,000 g/mol, or ≤560,000 g/mol, or ≤540,000 g/mol, or ≤520,000 g/mol, or ≤500,000 g/mol, or ≤490,000 g/mol.

Y3] The composition of any one of B3]-X3] above, wherein, the alpha composition has a molecular weight distribution MWD (=Mw/Mn)≥3.00, or ≥3.05, or ≥3.10, or ≥3.15, or ≥3.20, or ≥3.25, or ≥, 3.50, or ≥4.00, or ≥4.20, or ≥4.40.

Z3] The composition of any one of B3]-Y3] above, wherein the alpha composition has a molecular weight distribution MWD (=Mw/Mn)≤10.0, or ≤9.00, or ≤8.00, or ≤7.50, or ≤7.00, or ≤6.80, or ≤6.60, or ≤6.50, or ≤6.40, or ≤6.30.

A4] The composition of any one of B3]-Z3] above, wherein the alpha composition has a melting temperature (Tm, DSC)≥30° C., or ≥35° C., or ≥40° C., or ≥45° C., or ≥50° C., or ≥51° C., or ≥52° C., or ≥53° C.

B4] The composition of any one of B3]-A4] above, wherein the alpha composition has a melting temperature (Tin, DSC)≤100° C., or ≤95° C., or ≤90° C., or ≤85° C., or ≤80° C., or ≤78° C., or ≤76° C., or 75° C.

C4] The composition of any one of B3]-B4] above, wherein the alpha composition has a glass transition temperature (Tg, DSC)≥-68° C., or ≥-66° C., or -64° C., or ≥-62° C., or ≥-60° C.

D4] The composition of any one of B3]-C4] above, wherein the alpha composition has a glass transition temperature (Tg, DSC)≤-42° C. or ≤-44° C., or ≤-46° C., or ≤-48° C.

E4] The composition of any one of B3]-D4] above, wherein the alpha composition has a crystallization temperature (Tc, DSC)≥14° C., or ≥16° C., or ≥18° C., or ≥20° C., or ≥22° C.

F4] The composition of any one of B3]-E4] above, wherein the alpha composition has a crystallization temperature (Tc, DSC)≤80° C., or ≤78° C., or ≤76° C., or ≤74° C., or ≤72° C., or ≤70° C., or ≤68° C., or ≤66° C.

G4] The composition of any one of B3]-F4] above, wherein the alpha composition has a % crystallinity ≥14%, or ≥16%, or ≥18%, or ≥20%.

H4] The composition of any one of B3]-G4] above, wherein the alpha composition has a % crystallinity ≤40%, or ≤35%, or ≤30%, or ≤28%.

I4] The composition of any one of B3]—H4] above, wherein the first ethylene/alpha-olefin interpolymer fraction differs from the second ethylene/alpha-olefin interpolymer fraction in one or more polymer properties, and further in one or more properties selected from density, I2, I10/I2, Mn, Mw, Mz, MWD, or any combination thereof, and further in one or more properties selected from Mn, Mw, Mz, MWD, or any combination thereof.

J4] The composition of any one of B3]-I4] above, wherein the alpha composition comprises 50 wt % or a majority weight percent of polymerized ethylene, based on the weight of the alpha composition.

K4] The composition of any one of B3]-J4] above, wherein the alpha composition comprises ≥98.0 wt %, or ≥98.5 wt %, or ≥99.0 wt %, or ≥99.5 wt %, or ≥99.8 wt %, or ≥99.9 wt % of the sum of the first ethylene/alpha-olefin interpolymer fraction and the second ethylene/alpha-olefin interpolymer fraction, based on the weight of the alpha composition.

L4] The composition of any one of B3]-K4] above, wherein the alpha composition comprises ≤1000 wt % of sum of the first ethylene/alpha-olefin interpolymer fraction and the second ethylene/alpha-olefin interpolymer fraction, based on the weight of the alpha composition.

M4] The composition of any one of B3]-L4] above, wherein, for the first ethylene/alpha-olefin interpolymer fraction, the alpha-olefin is a $C_3$-$C_{20}$ α-olefin, further a $C_3$-$C_{10}$ α-olefin.

N4] The composition of any one of B3]-M4] above, wherein, for the first ethylene/alpha-olefin interpolymer fraction, the alpha-olefin is selected from propylene, 1-butene, 1-pentene, 1-hexene or 1-octene, and further propylene, 1-butene or 1-octene, and further 1-butene or 1-octene, and further 1-octene.

O4] The composition of any one of B31-N4] above, wherein the first ethylene/alpha-olefin interpolymer fraction is an ethylene/alpha-olefin copolymer.

P4] The composition of any one of B3]-O4] above, wherein the first ethylene/alpha-olefin interpolymer fraction is selected from the following: an ethylene/propylene copolymer, an ethylene/butene copolymer, or an ethylene/octene copolymer, and further an ethylene/-butene copolymer, or an ethylene/octene copolymer, and further an ethylene/octene copolymer.

Q4] The composition of any one of B3]-P4] above, wherein, for the second ethylene/alpha-olefin interpolymer fraction, the alpha-olefin is a $C_3$-$C_{20}$ α-olefin, further a $C_3$-$C_{10}$ α-olefin.

R4] The composition of any one of B3]-Q4] above, wherein, for the second ethylene/-alpha-olefin interpolymer fraction, the alpha-olefin is selected from propylene, 1-butene, 1-pentene, 1-hexene or 1-octene, and further propylene, 1-butene or 1-octene, and further 1-butene or 1-octene, and further 1-octene.

S4] The composition of any one of B3]-R4] above, wherein the second ethylene/alpha-olefin interpolymer fraction is an ethylene/alpha-olefin copolymer.

T4] The composition of any one of B3]-S4] above, wherein the second ethylene/alpha-olefin interpolymer fraction is selected from the following: an ethylene/propylene copolymer, an ethylene/butene copolymer, or an ethylene/octene copolymer, and further an ethylene/-butene copolymer, or an ethylene/octene copolymer, and further an ethylene/octene copolymer.

U4] The composition of any one of B3-T4] above, wherein the composition comprises ≥50.0 wt %, or ≥55.0 wt %, or ≥60.0 wt %, or ≥65.0 wt %, or ≥70.0 wt %, or ≥75.0 wt %, or ≥80.0 wt %, or ≥85.0 wt %, or ≥90.0 wt % of the alpha composition, based on the weight of the composition.

V4] The composition of any one of B3]-U4] above, wherein the composition comprises ≥95.0 wt %, or ≥95.5 wt %, or ≥96.0 wt %, or ≥96.5 wt %, or ≥97.0 wt %, or ≥97.5 wt %, or ≥98.0 wt %, or ≥98.5 wt % of the alpha composition, based on the weight of the composition.

W4] The composition of any one of B3]-V4] above, wherein the composition comprises ≤99.8 wt %, ≤99.6 wt %, or ≤99.4 wt %, or ≤99.2 wt %, or ≤99.0 wt %, or ≤98.8 wt %, of the alpha composition, based on the weight of the composition.

X4] The composition of any one of UUJ]-W4] above, wherein the composition further comprises at least one additive selected from UV stabilizers, antioxidants or combinations thereof.

Y4] The composition of any one of B3]-X4] above, wherein the weight ratio of the first ethylene/alpha-olefin interpolymer fraction to the second ethylene/alpha-olefin interpolymer fraction is ≥0.20, or ≥0.22, or ≥0.24, or ≥0.26 or ≥0.28, or ≥0.30, or ≥0.32, or ≥0.34, or ≥0.36, or ≥0.38, or ≥0.39, or ≥0.40, or ≥0.42, or ≥0.44, or ≥0.46, or ≥0.48.

Z4] The composition of any one of B3]-Y4] above, wherein the weight ratio of the first ethylene/alpha-olefin interpolymer fraction to the second ethylene/alpha-olefin interpolymer fraction is ≤2.00 or ≤1.80, or ≤1.50, or ≤1.40, or ≤1.30, or ≤1.25, or ≤1.20, or ≤1.15, or ≤1.10.

A5] The composition of any one of B3]-Z4] above, wherein the first ethylene/alpha-olefin interpolymer fraction has a number average molecular weight Mn≥40,000 g/mol, or ≥42,000 g/mol, or ≥44,000 g/mol, or ≥46,000 g/mol, or ≥48,000 g/mol, or ≥50,000 g/mol 52,000 g/mol, or ≥54,000 g/mol, or ≥56,000 g/mol, or ≥58,000 g/mol.

B5] The composition of any one of B3]-A5] above, wherein the first ethylene/alpha-olefin interpolymer fraction has a number average molecular weight Mn≤150,000 g/mol, or ≤145,000 g/mol, or ≤140,000 g/mol, or ≤135,000 g/mol, or ≤130,000 g/mol.

C5] The composition of any one of B3]-B5] above, wherein the second ethylene/alpha-olefin interpolymer fraction has a number average molecular weight Mn≥6,000 g/mol, or ≥7,000 g/mol, or ≥8,000 g/mol, or ≥9,000 g/mol, or ≥10,000 g/mol, or ≥11,000 g/mol.

D5] The composition of any one of B3]-C5] above, wherein the second ethylene/alpha-olefin interpolymer fraction has a number average molecular weight Mn≤35,000 g/mol, or ≤30,000 g/mol, or ≤28,000 g/mol, or ≤26,000 g/mol, or ≤24,000 g/mol.

E5] The composition of any one of B3]-D5] above, wherein the ratio [$Mn_{(first\ ethylene/alpha-olefin\ interpolymer\ fraction)}$/$Mn_{(second\ ethylene/alpha-olefin\ interpolymer\ fraction)}$]≥2-0, or ≥2-2, or ≥2.4, or ≥2.6, or ≥2.8, or ≥3.0 or ≥3.2, or ≥3.4.

F5] The composition of any one of B3]-E5] above, wherein the ratio [$Mn_{(first\ ethylene/alpha-olefin\ interpolymer\ fraction)}$/$Mn_{(second\ ethylene/alpha-olefin\ interpolymer\ fraction)}$]≤12.0, or ≤11.5, or ≤11.0, or ≤10.8, or ≤10.6, or ≤10.4, or ≤10.2, or ≤10.0.

G5] A crosslinked composition formed from the composition of any one of B3]-F5] above.

H5] An article comprising at least one component formed from the composition of any one of B3]-G5] above.

I5] The article of H5] above, wherein the article is a film, and further an extruded film.

J5] The article of H5] above, wherein the article is a solar cell module.

K5] The process of any one of A]-A3] above, wherein, for Structure 2, Y is either —$(CH_2)_n$—, where n=0 to 2, further n=1 or 2, further n=1; —$CR^aR^b$—, where $R^a$ and $R^b$ are each independently ($C_1$-$C_{40}$)hydrocarbyl, ($C_1$-$C_{40}$)heterohydrocarbyl, or —H; —$Ge(R^D)_2$— or —$Si(R^D)_2$—, where each $R^D$ is independently selected from the group consisting of —H, ($C_1$-$C_{40}$)hydrocarbyl and ($C_1$-$C_{40}$)heterohydrocarbyl.

Test Methods

Small Amplitude Oscillatory Shear (SAOS)

The rheology of each composition was analyzed by SAOS (or DMS), using an ARES-G2 Rheometer, equipped with "25 mm diameter" stainless steel parallel plates, under a nitrogen purge. A constant temperature dynamic frequency sweep was performed, in the range of 0.1 to 100 rad/s or 500 rad/s, at 190° C. The data at 190° C. was used to evaluate the processability of the composition.

A sample of approximately "25 mm diameter x 3.3 mm thick" was cut from a compression molded disc (see below). The sample was placed on the lower plate, and allowed to melt for five minutes. The plates were then closed to a gap of "2.0 mm," and the sample trimmed to "25 mm" in diameter. The sample was allowed to reach thermal equilibrium for five minutes, before starting the test. The complex viscosity was measured at a constant strain amplitude well within the linear viscoelastic range (for example, 10%). The stress response was analyzed in terms of amplitude and phase, from which the storage modulus (G'), loss modulus (G"), dynamic viscosity η*, and tan delta could be calculated. Each compression molded disc was formed at 180° C., and 10 MPa molding pressure, for five minutes, ambient atmosphere, and then quenched between chilled platens (15-20° C.) for two minutes. The Viscosities (V0.1, V1.0, V100, each at 190° C. were recorded.

Gel Permeation Chromatography

The chromatographic system consisted of a PolymerChar GPC-IR (Valencia, Spain) high temperature GPC chromatograph, equipped with an internal IR5 infra-red detector (IR5). The autosampler oven compartment was set at 1600 Celsius, and the column compartment was set at 150° Celsius. The columns were four AGILENT "Mixed A" 30 cm 20-micron linear mixed-bed columns. The chromatographic solvent was 1,2,4-trichloro-benzene, which contained 200 ppm of butylated hydroxytoluene (BUT). The solvent source was nitrogen sparged. The injection volume used was 200 microliters, and the flow rate was 1.0 milliliters/minute.

Calibration of the CPC column set was performed with 21 narrow molecular weight distribution polystyrene standards, with molecular weights ranging from 580 to 8,400,000, and which were arranged in six "cocktail" mixtures, with at least a decade of separation between individual molecular weights. The standards were purchased from Agilent Technologies. The polystyrene standards were prepared at "0.025 grains in 50 milliliters" of solvent, for molecular weights equal to or greater than 1,000,000, and at "0.05 grams in 50 milliliters" of solvent, for molecular weights less than 1,000, 000. The polystyrene standards were dissolved at 80 degrees Celsius, with gentle agitation, for 30 minutes. The polystyrene standard peak molecular weights were converted to polyethylene molecular weights using Equation 1 (as described in Williams and Ward, J. Polym. Sci., Polym. Let., 6, 621 (1968)):

$M_{polyethylene} = A \times (M_{polystyrene})^B$ (EQ1), where M is the molecular weight, A has a value of 0.4315 and B is equal to 1.0.

A fifth order polynomial was used to fit the respective polyethylene-equivalent calibration points. A small adjustment to A (from approximately 0.375 to 0.445) was made to correct for column resolution and band-broadening effects, such that linear homopolymer polyethylene standard is obtained at 120,000 Mw.

The total plate count of the GPC column set was performed with decane (prepared at 0.04 g in 50 milliliters of TCB, and dissolved for 20 minutes with gentle agitation.) The plate count (Equation 2) and symmetry (Equation 3) were measured on a 200 microliter injection according to the following equations:

$$\text{Plate Count} = 5.54 * \left( \frac{(RV_{Peak\ Max})}{\text{Peak Width at } \frac{1}{2} \text{ height}} \right)^2, \quad (EQ2)$$

where RV is the retention volume in milliliters, the peak width is in milliliters, the peak max is the maximum height of the peak, and ½ height is ½ height of the peak maximum; and $$\text{Symmetry} = \frac{(\text{Rear Peak } RV_{one\ tenth\ height} - RV_{Peak\ max})}{(RV_{Peak\ max} - \text{Front Peak } RV_{one\ tenth\ height})}, \quad (EQ3)$$

where RV is the retention volume in milliliters, and the peak width is in milliliters, Peak max is the maximum position of the peak, one tenth height is 1/10 height of the peak maximum, and where rear peak refers to the peak tail at later retention volumes than the peak max, and where front peak refers to the peak front at earlier retention volumes than the peak max. The plate count for the chromatographic system should be greater than 18,000, and symmetry should be between 0.98 and 1.22.

Samples were prepared in a semi-automatic manner with the PolymerChar "Instrument Control" Software, wherein the samples were weight-targeted at 2 mg/ml, and the solvent (contained 200 ppm BHT) was added to a pre nitrogen-sparged, septa-capped vial, via the PolymerChar high temperature autosampler. The samples were dissolved for two hours at 1600 Celsius under "low speed" shaking.

The calculations of $Mn_{(GPC)}$, $Mw_{(GPC)}$, and $Mz_{(GPC)}$ were based on GPC results using the internal IR5 detector (measurement channel) of the PolymerChar GPC-IR chromatograph according to Equations 4-6, using PolymerChar GPCOne™ software, the baseline-subtracted IR chromatogram at each equally-spaced data collection point (i), and the polyethylene equivalent molecular weight obtained from the narrow standard calibration curve for the point (i) from Equation 1. Equations 4-6 are as follows:

$$Mn_{(GPC)} = \frac{\sum_i IR_i}{\sum_i (IR_i/M_{polyethylene_i})}, \quad (EQ4)$$

$$Mw_{(GPC)} = \frac{\sum_i (IR_i * M_{polyethylene_i})}{\sum_i IR_i}, \text{ and} \quad (EQ5)$$

$$Mz_{(GPC)} = \frac{\sum_i (IR_i * M_{polyethylene_i}^2)}{\sum_i (IR_i * M_{polyethylene_i})}. \quad (EQ6)$$

In order to monitor the deviations over time, a flowrate marker (decane) was introduced into each sample, via a micropump controlled with the PolymerChar GPC-IR system. This flowrate marker (FM) was used to linearly correct the pump flowrate (Flowrate(nominal)) for each sample, by RV alignment of the respective decane peak within the sample (RV(FM Sample)), to that of the decane peak within the narrow standards calibration (RV(FM Calibrated)). Any changes in the time of the decane marker peak were then assumed to be related to a linear-shift in flowrate (Flowrate (effective)) for the entire run. To facilitate the highest accuracy of a RV measurement of the flow marker peak, a least-squares fitting routine was used to fit the peak of the flow marker concentration chromatogram to a quadratic equation. The first derivative of the quadratic equation was then used to solve for the true peak position. After calibrating the system, based on a flow marker peak, the effective flowrate (with respect to the narrow standards calibration) was calculated as Equation 7: Flowrate(effective)=Flowrate (nominal)*(RV(FM Calibrated)/RV(FM Sample)) (EQ7).

Processing of the flow marker peak was done via the PolymerChar GPCOne™ Software. Acceptable flowrate correction is such that the effective flowrate should be within +/−0.7% of the nominal flowrate.

GPC Deconvolution

The GPC data were deconvoluted to give the most probable fit for two molecular weight components. The algorithm used is optimized for the deconvolution problem of the two most probable molecular weight distributions (plus an adjustable error term). In order to allow for the variations in the underlying distributions, due to the macromer incorporation and small fluctuations in the reactor conditions (i.e., temperature, concentration), the basic functions were modified to incorporate a normal distribution term. This term allows the basis function for each component to be "smeared" to varying degrees along the molecular weight axis. The advantage is that in the limit (low LCB, perfect concentration and temperature control) the basis function will become a simple, most probable, Flory distribution.

Three components (j=1, 2, 3) are derived with the third component (j=3) being an adjustable error term. The GPC data must be normalized and properly transformed into "weight fraction versus Log 10 molecular weight" vectors. In other words, each potential curve for deconvolution should consist of a height vector, $h_i$, where the heights are reported at known intervals of "Log 10 molecular weight," the $h_i$ values have been properly transformed from the elution volume domain to the "Log 10 molecular weight" domain, and the $h_i$ values are normalized. Additionally, these data should be made available for the Microsoft EXCEL application. Several assumptions are made in the deconvolution. Each component, j, consists of a most probable, Flory, distribution, which has been convoluted with a normal or Gaussian spreading function using a parameter, $\sigma_j$. The resulting, three basis functions are used in a Chi-square, $X^2$, minimization routine to locate the parameters that best fit the n points in $h_i$, the GPC data vector.

$$X^2(\mu_j, \sigma_j, w_j) = \sum_{i=1}^{n} \left[ \sum_{j=1}^{3} \cdot \sum_{k=1}^{20} w_j \cdot M_i^2 \cdot \lambda_{j,k}^2 \cdot \right.$$

$$\left. CumND_{j,k} \cdot e^{-\lambda_{j,k} \cdot M_i} \cdot \Delta Log_{10} M - h_i \right]^2 \lambda_{j,k} = 10^{\mu_j + \frac{k-10}{3} \cdot \sigma_j}$$

The variable, $CumND_{j,k}$, is calculated using the EXCEL function "NORMDIST(x, mean, standard dev, cumulative)" with the parameters set as follows: $x=\mu_j+(k-10)*\sigma_j/3$; mean=$\mu_j$; standard dev=$\sigma_j$; cumulative=TRUE. Table A below summarizes these variables and their definitions. The use of the EXCEL software application, SOLVER, is adequate for this task. Constraints are added to SOLVER to insure proper minimization.

TABLE A

Variable Definitions

| Variable Name | Definition |
|---|---|
| $\lambda_{j,k}$ | Reciprocal of the number average molecular weight of most probable (Flory) distribution for component j, normal distribution slice k |
| $\sigma_j$ | Sigma (square root of variance) for normal (Gaussian) spreading function for component j. |
| $w_j$ | Weight fraction of component j |
| K | Normalization term (1.0/$Log_e$ 10) |

TABLE A-continued

Variable Definitions

| Variable Name | Definition |
| --- | --- |
| $M_i$ | Molecular weight at elution volume slice i |
| $h_i$ | Height of $\log_{10}$ (molecular weight) plot at slice i |
| n | Number of slices in Log molecular weight plot |
| i | Log molecular weight slice index (1 to n) |
| j | Component index (1 to 3) |
| k | Normal distribution slice index |
| $\Delta \log_{10} M$ | Average difference between $\log_{10} M_i$ and $\log_{10} M_{i-1}$ in height vs. $\log_{10} M$ plot |

The eight parameters that are derived from the Chi-square minimization are $\mu_1$, $\mu_2$, $\mu_3$, $\sigma_1$, $\sigma_2$, $\sigma_3$, $w_1$ and $w_2$. The term $w_3$ is subsequently derived from $w_1$ and $w_2$, since the sum of the three components must equal "one." Table B is a summary of the SOLVER constraints used in the EXCEL program.

TABLE B

Constraint Summary

| Description | Constraint |
| --- | --- |
| Maximum of fraction 1 | $w_1 < 0.95$ (User adjustable) |
| Lower limit of spreading function | $\sigma_1, \sigma_2, \sigma_3 > 0.001$ (must be positive) |
| Upper limit of spreading function | $\sigma_1, \sigma_2, \sigma_3 < 0.2$ (User adjustable) |
| Normalized fractions | $w_1 + w_2 + w_3 = 1.0$ |

Additional constraints that are to be understood include the limitation that only $\mu_j > 0$ are allowed, although, if SOLVER is properly initialized, this constraint need not be entered, as the SOLVER routine will not move any of the $\mu_j$ to values less than about 0.005. Also, the $w_j$ are all understood to be positive. This constraint can be handled outside of SOLVER. If the $w_j$ are understood to arise from the selection of two points along the interval $0.0 < P_1 < P_2 < 1.0$; whereby $w_1 = P_1$, $w_2 = P_2 - P_1$ and $w_3 = 1.0 - P_2$; then constraining $P_1$ and $P_2$ are equivalent to the constraints required above for the $w_j$. Table C is a summary of the SOLVER settings under the Options tab.

TABLE C

Solver Settings

| Label | Value or Selection |
| --- | --- |
| Max Time (seconds) | 1000 |
| Iterations | 100 |
| Precision | 0.000001 |
| Tolerance (%) | 5 |
| Convergence | 0.001 |
| Estimates | Tangent |
| Derivatives | Forward |
| Search | Newton |
| ALL OTHER SELECTIONS | Not selected |

A first guess for the values of $\mu_1$, $\mu_2$, $w_1$, and $w_2$ can be obtained by assuming two ideal Flory components that give the observed weight average, number average, and z-average molecular weights for the observed GPC distribution, $$M_{n,GPC} = \left[ w_1 \cdot \frac{1}{10^{\mu_1}} + w_2 \cdot \frac{1}{10^{\mu_2}} \right]^{-1}$$

-continued $$M_{w,GPC} = [w_1 \cdot 2 \cdot 10^{\mu_1} + w_2 \cdot 2 \cdot 10^{\mu_2}]/M_{n,GPC}$$

$$M_{z,GPC} = [w_1 \cdot 6 \cdot 10^{\mu_1} + w_2 \cdot 6 \cdot 10^{\mu_2}]/M_{w,GPC}$$

$$w_1 + w_2 = 1$$

The values of $\mu_1$, $\mu_2$, $w_1$, and $w_2$ are then calculated. These should be adjusted carefully to allow for a small error term, $w_3$ and to meet the constraints in Table B before entering into SOLVER for the minimization step. Starting values for $\sigma_j$ are all set to 0.05.

Differential Scanning Calorimetry (DSC)

Differential Scanning Calorimetry (DSC) is used to measure Tm, Tc, Tg and crystallinity in ethylene-based (PE) samples and propylene-based (PP) samples. Each sample (0.5 g) was compression molded into a film, at 5000 psi, 190° C., for two minutes. About 5 to 8 mg of film sample was weighed and placed in a DSC pan. The lid was crimped on the pan to ensure a closed atmosphere. The sample pan was placed in a DSC cell, and then heated, at a rate of approximately 10° C./min. to a temperature of 180° C. for PE (230° C. for PP). The sample was kept at this temperature for three minutes. Then the sample was cooled at a rate of 10° C./min to −90° C. for PE (−60° C. for PP), and kept isothermally at that temperature for three minutes. The sample was next heated at a rate of 10° C./min, until complete melting (second heat). Unless otherwise stated, melting point (Tm) and the glass transition temperature (Tg) of each polymer were determined from the second heat curve, and the crystallization temperature (Tc) was determined from the first cooling curve. The respective peak temperatures for the Tm and the Tc were recorded. The percent crystallinity can be calculated by dividing the heat of fusion (Hf), determined from the second heat curve, by a theoretical heat of fusion of 292 J/g for PE (165 J/g for PP), and multiplying this quantity by 100 (for example, % cryst.=(Hf/292 J/g)×100 (for PE)).

Melt Index

The melt flow index I2 of an ethylene-based polymer is measured in accordance with ASTM D-1238, condition 190° C./2.16 kg (melt index I5 at 190° C./5.0 kg, melt index I10 at 190° C./10.0 kg, high load melt index I21 at 190° C./21.0 kg). The melt flow rate of a propylene-based polymer (MFR)—ASTM D-1238, condition 230° C./2.16 kg.

Polymer Density Polymer density is measured in accordance with ASTM D-792.

EXPERIMENTAL

Catalysts, Cocatalysts, Polymer Syntheses (Alpha Compositions) and Properties

BPP catalysts and useful cocatalysts are listed in Table 1. Each alpha composition was prepared in a one gallon polymerization reactor, which was hydraulically full, and operated at steady state conditions. The catalysts and cocatalysts are listed above. The solvent, hydrogen, catalysts, and co-catalysts were fed to the reactor, according to the process conditions outlined in Tables 1A, 1B, and 1C, to produce the alpha compositions. The solvent was ISOPAR E supplied by the ExxonMobil Chemical Company. The reactor temperature was measured at or near the exit of the reactor. Overall properties are shown in Tables 2-4, and molecular weight properties of the interpolymer fractions are shown in Table 5.

TABLE 1
Catalysts and Cocatalysts
| Catalyst | Description |
| --- | --- |
| BPP-A | 6',6'''-(((diisopropylsilanediyl)bis(methylene))bis(oxy))bis(3-(3,6-di-tert-butyl-9H-carbazol-9-yl)-3'-fluoro-5-(2,4,4-trimethylpentan-2-yl)-[1,1'-biphenyl]-2-ol)dimethyl-hafnium (WO2018022975). |
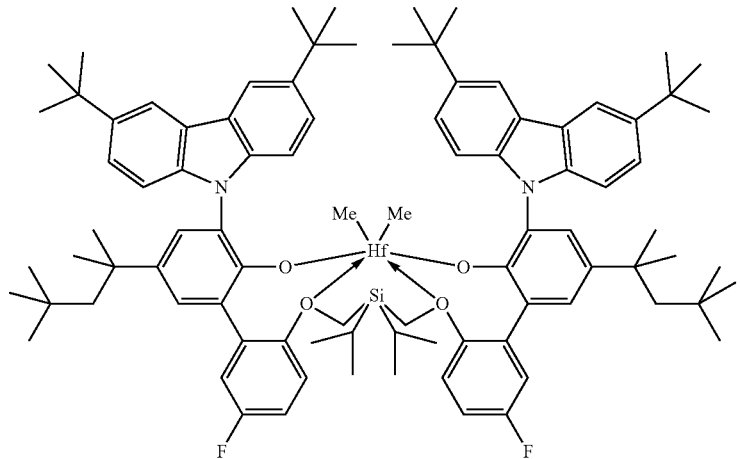
| | |
| --- | --- |
| BPP-B | 6',6'''-(propane-1,3-diylbis(oxy))bis(3-(3,6-di-tert-butyl-9H-carbazol-9-yl)-3'-fluoro-5-(2,4,4-trimethylpentan-2-yl)-[1,1'-biphenyl]-2-ol)dimethyl-zirconium (WO2012027448). |
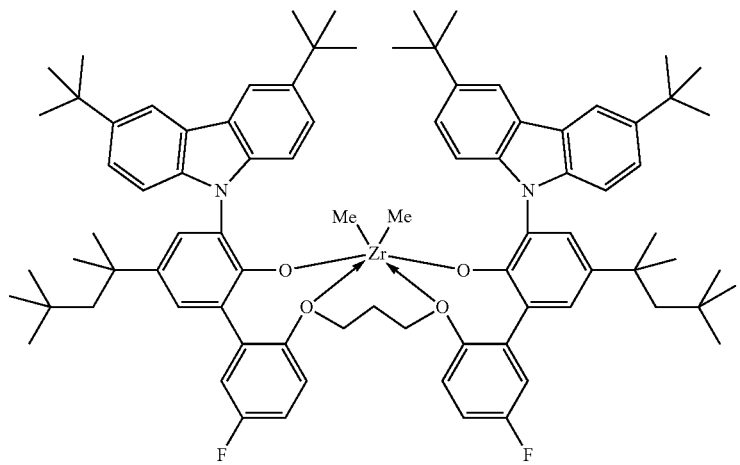

TABLE 1-continued

Catalysts and Cocatalysts

| Catalyst | Description |
|---|---|
| BPP-C | 6',6'''-((2-(tert-butyl)propane-1,3-diyl)bis(oxy))bis(3-(3,6-di-tert-butyl-9H-carbazol-9-yl)-3'-fluoro-5-(2,4,4-trimethylpentan-2-yl)-[1,1'-biphenyl]-2-ol)dimethyl-zirconium (WO2016014749). |

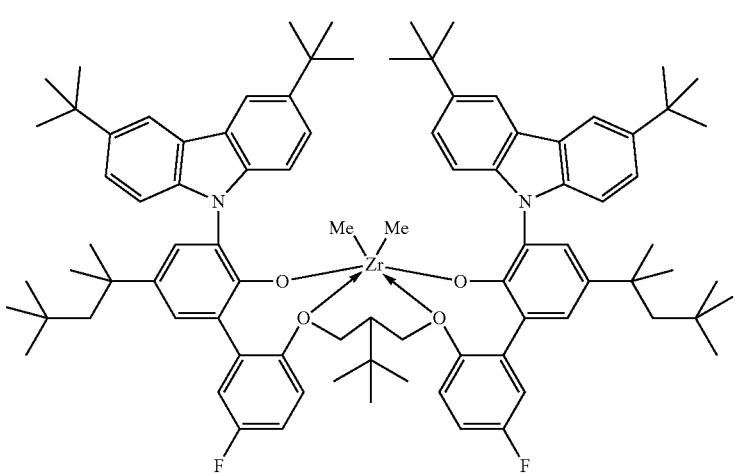

| | |
|---|---|
| CoCAT-1 | A mixture of methyldi($C_{14-18}$ alkyl)ammonium salts of tetrakis(pentafluorophenyl)-borate, prepared by reaction of a long chain trialkylamine (ARMEEN M2HT, available from Akzo-Nobel, Inc.), HCl and Li[B($C_6F_5$)$_4$], substantially as disclosed in U.S. Pat. No. 5,919,983, Ex. 2 (no further purification performed). Available from Boulder Scientific. |
| CoCAT-2 | Modified methylalumoxane (MMAO) Type 3A (no further purification performed). Available from Akzo Nobel. |

TABLE 1A

Reactor Conditions

| | Reactor Temp., °C. | Reactor Pressure, psig | Solvent, lb/hr | Ethylene, lb/hr | Octene, lb/hr | Hydrogen, sccm | Ethylene conversion, % | H2/Ethylene mass feed Ratio (g/g) |
|---|---|---|---|---|---|---|---|---|
| POE A | 165 | 651 | 37.55 | 4.15 | 8.05 | 25.8 | 78.0 | 7.40E−05 |
| POE B | 165 | 650 | 28.99 | 4.15 | 6.22 | 85.7 | 81.6 | 2.45E−04 |
| POE C | 165 | 650 | 29.02 | 4.15 | 6.23 | 25.5 | 82.7 | 7.31E−05 |
| POE D | 165 | 650 | 29.01 | 4.15 | 6.23 | 83.2 | 82.1 | 2.38E−04 |
| POE E | 165 | 650 | 29.01 | 4.15 | 5.85 | 154.8 | 81.7 | 4.44E−04 |
| POE F | 165 | 650 | 29.01 | 4.15 | 4.50 | 58.6 | 81.7 | 1.68E−04 |

TABLE 1B

Catalyst Feed Flows and Efficiency

| | Catalyst 1 | Catalyst 1 Solution Flow, lb/hr | Catalyst 1 Solution Metal Conc., ppm* | Catalyst 2 | Catalyst 2 Solution Flow, lb/hr | Catalyst 2 Solution Metal Conc., ppm* | Overall Catalyst Efficiency, (10^6 g alpha comp./g total catalyst metal) |
|---|---|---|---|---|---|---|---|
| POE A | BPP-A | 0.13 | 5.59 | BPP-B | 0.35 | 1.10 | 4.8 |
| POE B | BPP-A | 0.13 | 5.59 | BPP-C | 0.39 | 2.20 | 3.6 |
| POE C | BPP-A | 0.35 | 1.39 | BPP-C | 0.18 | 5.59 | 3.8 |
| POE D | BPP-A | 0.38 | 1.39 | BPP-C | 0.17 | 5.59 | 3.8 |
| POE E | BPP-A | 0.50 | 1.39 | BPP-C | 0.24 | 3.40 | 3.6 |
| POE F | BPP-A | 0.30 | 1.39 | BPP-C | 0.25 | 3.40 | 3.9 |

*The "ppm" amount based on the weight of the respective catalyst feed solution.

TABLE 1C

Cocatalyst Feed Flows

| | CoCAT-1 Solution Flow, lb/hr | CoCAT-1 Solution Conc., ppm CoCAT-1* | Co-CAT-2 Solution Flow, lb/hr | CoCAT-2 Solution Conc., ppm Al** |
|---|---|---|---|---|
| POE A | 0.20 | 61.5 | 0.11 | 42.0 |
| POE B | 0.32 | 61.5 | 0.17 | 42.0 |
| POE C | 0.32 | 61.5 | 0.18 | 42.0 |
| POE D | 0.31 | 61.5 | 0.17 | 42.0 |
| POE E | 0.30 | 61.5 | 0.17 | 42.0 |
| POE F | 0.27 | 61.5 | 0.15 | 42.0 |

*The "ppm" amount based on the weight of the co-catalyst feed solution.
**The "ppm" amount of Al based on the weight of the co-catalyst feed solution.

TABLE 2

Melt Index and GPC Properties

| Alpha Composition | Density (g/cc) | Melt Index I2 (g/10 min) | I10/I2 | Mn (kg/mol) | Mw (kg/mol) | Mz (kg/mol) | Mz/Mn | MWD (Mw/Mn) |
|---|---|---|---|---|---|---|---|---|
| POE A | 0.868 | 2.10 | 13.05 | 29 | 92 | 255 | 8.8 | 3.17 |
| POE B | 0.867 | 2.52 | 21.36 | 16 | 99 | 309 | 19.3 | 6.19 |
| POE C | 0.867 | 2.71 | 23.30 | 18 | 112 | 483 | 26.8 | 6.22 |
| POE D | 0.867 | 7.54 | 19.00 | 14 | 86 | 332 | 23.7 | 6.14 |
| POE E | 0.871 | 13.78 | 15.50 | 14 | 63 | 192 | 13.7 | 4.50 |
| POE F | 0.881 | 1.56 | 21.90 | 17 | 97 | 379 | 22.3 | 5.71 |

TABLE 3

DSC Properties

| Alpha Composition | Tg (°C) | Tm1 (°C) | Hf (J/g) | Tc1 (°C) | % Cryst.* |
|---|---|---|---|---|---|
| POE A | −56.3 | 67.0 | 63.0 | 58.4 | 22 |
| POE B | −55.8 | 53.5 | 64.6 | 23.3 | 22 |
| POE C | −56.2 | 57.3 | 75.6 | 46.3 | 26 |
| POE D | −57.4 | 55.6 | 61.9 | 35.0 | 21 |
| POE E | −56.8 | 55.4 | 67.1 | 75.8 | 23 |
| POE F | −49.6 | 74.0 | 78.3 | 64.1 | 27 |

*% Cryst. = (Hf/292 J/g) × 100.

TABLE 4

SAOS at 190° C.

| | V0.1 (Pa·s) | V1.0 (Pa·s) | V100 (Pa·s) | V0.1/V100 | V1.0/V100 |
|---|---|---|---|---|---|
| Alpha Composition | | | | | |
| POE A | 4432 | 2799 | 510 | 8.69 | 5.49 |
| POE B | 11088 | 5181 | 428 | 25.9 | 12.1 |
| POE C | 15219 | 4779 | 286 | 53.2 | 16.7 |
| POE D | 4689 | 2394 | 230 | 20.4 | 10.4 |
| POE E | 943 | 862 | 228 | 4.14 | 3.78 |
| POE F | 17164 | 5795 | 389 | 44.1 | 14.9 |
| Commercial Polymers | | | | | |
| ATEVA 2810A* | 2300 | 1960 | 437 | 5.26 | 4.49 |
| ENGAGE 8457** | 3202 | 2727 | 900 | 3.56 | 3.03 |

*ATEVA 2810A an ethylene vinyl acetate from Celanes: density 0.949 g/cc, I2 6 g/10 min.
**ENGAGE 8457 Polyolefin Elastomer from The Dow Chemical Company, ethylene/1-octene random copolymer: density 0.875 g/cc, I2 3 g/10 min.

TABLE 5

GPC Deconvolution

| Alpha Composition | First Interpolymer Fraction HMW (Mn, kg/mol) | Second Interpolymer Fraction LMW (Mn, kg/mol) | HMW/LMW wt. ratio |
|---|---|---|---|
| POE A | 71 | 21 | 35/65 |
| POE B | 97 | 23 | 52/48 |
| POE C | 127 | 13 | 29/71 |
| POE D | 59 | 11 | 40/60 |
| POE E | — | — | |
| POE F | 92 | 13 | 33/67 |

FIG. 1 shows the SAOS (190° C.) profiles for the inventive alpha compositions (POE A, POE B, POE C, POE F) and two commercial resins (ENGAGE 8457 Polyolefin Elastomer and ATEVA 2810A (an EVA (benchmark resin)). As seen in FIG. 1, compared to the ENGAGE 8457, the inventive alpha compositions show lower viscosity at high shear rates (at V>10 rad/s) for improved processability, and higher viscosity at lower shear rates (at V<1 rad/s) for improved mechanical strength. Most of the inventive samples also show comparable or better shear thinning, as compared to that of ATEVA 2810A, for excellent processability, and all have higher "low shear viscosities." Each inventive composition can be prepared in a cost-effective, one reactor synthesis, with excellent overall catalyst efficiency.

The invention claimed is:

1. A process to prepare an alpha composition comprising a first ethylene/alpha-olefin/interpolymer fraction and a second ethylene/alpha-olefin/interpolymer fraction; said process comprising polymerizing, in one reactor, a reaction mixture, comprising ethylene, an alpha-olefin, a metal complex selected from a) below, and a metal complex selected from b) below:
   a) a biphenyl phenol metal complex selected from the following Structures 1(a)-(c):

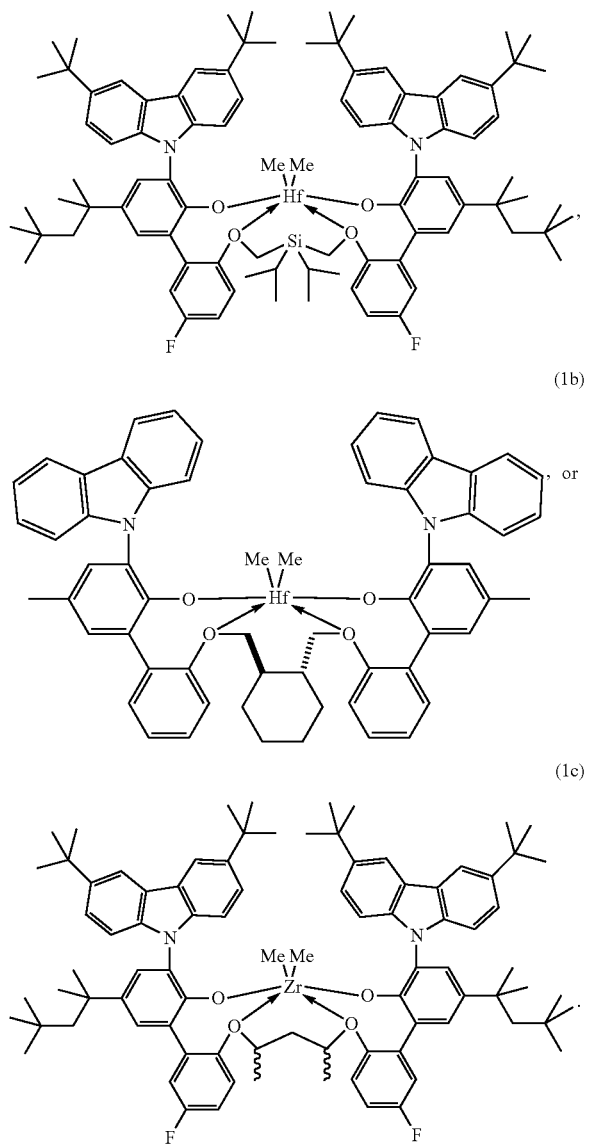

(1a), (1b), or (1c)

b) a biphenyl phenol metal complex selected from Structure 2:

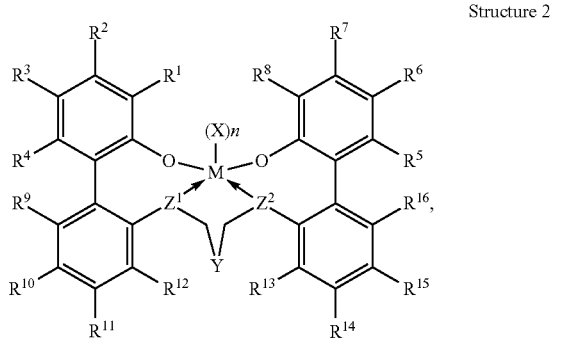

Structure 2 where

M is Zr or Hf, the metal being in a formal oxidation state of +2, +3, or +4;

n is 0, 1, or 2;

when n is 1, X is a monodentate ligand or a bidentate ligand;

when n is 2, each X is an independently chosen monodentate ligand;

the metal complex is overall charge-neutral;

each of —$Z^1$— and —$Z^2$— is independently selected from —O—, —S—, —N($R^N$)—, or —P($R^P$)—;

$R^1$ and $R^8$ are independently selected from the group consisting of —H, ($C_1$-$C_{40}$) hydrocarbyl, ($C_{1-40}$) heterohydrocarbyl, —Si($R^C$)$_3$, —Ge($R^C$)$_3$, —P($R^P$)$_2$, —N($R^N$)$_2$, —OR$^C$, —SR$^C$, —NO$_2$, —CN, —CF$_3$, $R^C$S(O)—, $R^C$S(O)$_2$—, ($R^C$)$_2$C=N—, $R^C$C(O)O—, $R^C$OC(O)—, $R^C$C(O)N(R)—, ($R^C$)$_2$NC(O)—, halogen, radicals having formula (I), radicals having formula (II), and radicals having formula (III):

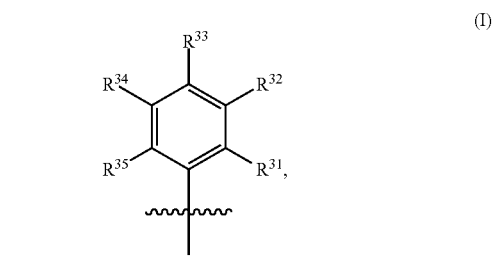

(I)

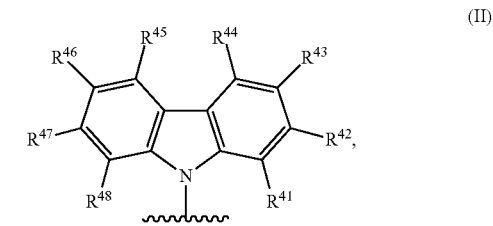

(II)

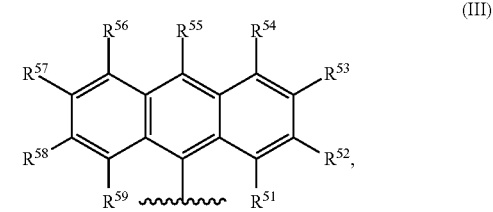

(III)

where each of $R^{31-35}$, $R^{41-48}$, and $R^{51-59}$ is independently selected from ($C_1$-$C_{40}$)hydrocarbyl, ($C_1$-$C_{40}$)heterohydrocarbyl, —Si($R^C$)$_3$, —Ge($R^C$)$_3$, —P($R^P$)$_2$, —N($R^N$)$_2$, —N=CHR$^C$, —OR$^C$, —SR$^C$, —NO$_2$, —CN, —CF$_3$, $R^C$S(O)—, $R^C$S(O)$_2$—, ($R^C$)$_2$C=N—, $R^C$C(O)O—, $R^C$OC(O)—, $R^C$C(O)N($R^N$)—, ($R^C$)$_2$NC(O)—, halogen, or —H;

each of $R^{2-7}$, $R^{9-16}$ is independently selected from ($C_1$-$C_{40}$) hydrocarbyl, ($C_1$-$C_{40}$)hydrocarbyl, —Si($R^C$)$_3$, —Ge($R^C$)$_3$, —P($R^P$)$_2$, —N($R^N$)$_2$, —N=CHR$^C$, —OR$^C$, —SR$^C$, —NO$_2$, —CN, —CF$_3$, $R^C$S(O)—, $R^C$S(O)$_2$—, ($R^C$)$_2$C=N—, $R^C$C(O)O—, $R^C$OC(O), $R^C$C(O)N($R^N$)—, ($R^C$)$_2$NC(O)—, halogen, or —H;

Y is either —(CH2)n-, where n=0 to 2; —CRaRb-, where Ra and Rb are each independently ($C_1$-$C_{40}$)hydrocarbyl, ($C_1$-$C_{40}$)heterohydrocarbyl, or —H; —Ge($R^D$)$_2$— or —Si($R^D$)$_2$—, where each $R^D$ is independently selected from the group consisting of —H, ($C_1$-$C_{40}$)

hydrocarbyl, $(C_1-C_{40})$heterohydrocarbyl, $-Si(R^C)_3$, $-Ge(R^C)_3$, $-P(R^P)_2$, $-N(R^N)_2$, $-OR^C$, $-SR^C$, $-NO_2$, $-CN$, $-CF3$, $R^CS(O)-$, $R^CS(O)_2-$, $(R^C)_2C=N-$, $R^CC(O)O-$, $R^COC(O)-$, $R^CC(O)N(R^N)-$, and $(R^N)_2NC(O)-$; and $R^C$, $R^P$, and $R^N$ in Structure 2 is independently a $(C_1-C_{30})$hydrocarbyl, a $(C_1-C_{30})$heterohydrocarbyl, or $-H$;

with the proviso that for Structure 2, $R^{12}$ and $R^{13}$ cannot both be halo, when $R^1$ and $R^8$ are each a radical having formula (II), where $R^{43}=R^{46}=$t-Bu, and $R^{41-42}=R^{44-45}=R^{47-48}=-H$; and with the proviso that when Structure 1 and Structure 2 have the same R groups, Z groups, X group(s), and linker group between $Z^1$ and $Z^2$, these structures do not have the same metal (M), such that if M is Hf for one structure, the M is Zr for the other structure, wherein the process has an overall catalyst efficiency $\geq 2.8 \times 10^6$ [(gram alpha composition) per (gram total catalyst metal)], at an alpha composition density from 0.855 to 0.890 g/cc.

2. The process of claim 1, wherein for Structure 2, $R^1$ and $R^8$ are identical, and selected from the group consisting of radicals having formula (I), radicals having formula (II), and radicals having formula (III).

3. The process of claim 1, wherein for Structure 2, Y is selected from the following:

i) $-SiR^cR^d-$, or $-GeR^cR^d-$ where $R^c$ and $R^d$ are each, independently, a $(C_1-C_{30})$hydrocarbyl or a $(C_1-C_{30})$heterohydrocarbyl;

ii) $-(CH_2)_n-$, where n=0 to 2; or iii) $-CR^aR^b-$, where $R^a$ and $R^b$ are each, independently, a $(C_1-C_{30})$hydrocarbyl, a $(C_1-C_{30})$heterohydrocarbyl, or $-H$.

4. The process of claim 1, wherein Structure 2 is selected from the following structures 2a or 2b:

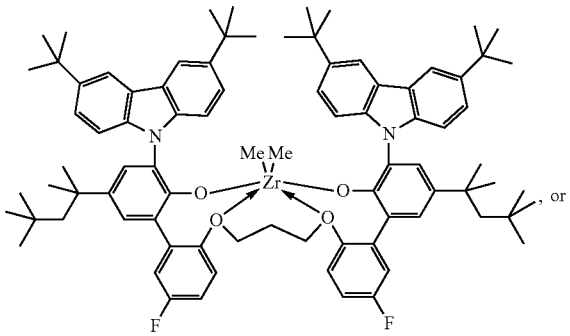

(2a)

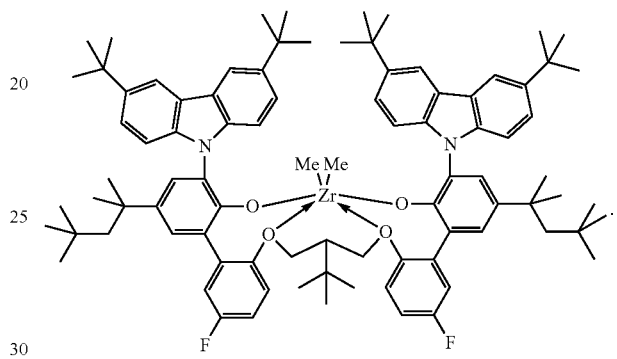

(2b)

5. The process of claim 1, wherein the process has an overall catalyst efficiency $\geq 2.8 \times 10^6$ [(gram alpha composition) per (gram total catalyst metal)], at a reactor temperature $\geq 150°$ C.

6. The process of claim 1, wherein a mass flow ratio of hydrogen reactor feed to ethylene reactor feed is $\leq 6.00 \times 10^{-4}$ g/g.

7. The process of claim 1, wherein the process is run at a reactor temperature $\geq 150°$ C.

* * * * *